US012603456B2

(12) United States Patent
Tsumuraya

(10) Patent No.: US 12,603,456 B2
(45) Date of Patent: Apr. 14, 2026

(54) CONNECTOR AND CONNECTOR ASSEMBLY

(71) Applicant: MOLEX, LLC, Lisle, IL (US)

(72) Inventor: Tetsunori Tsumuraya, Yamato (JP)

(73) Assignee: Molex, LLC, Lisle, IL (US)

( * ) Notice: Subject to any disclaimer, the term of this patent is extended or adjusted under 35 U.S.C. 154(b) by 336 days.

(21) Appl. No.: 18/274,219

(22) PCT Filed: Jan. 27, 2022

(86) PCT No.: PCT/IB2022/050699

§ 371 (c)(1),
(2) Date: Jul. 26, 2023

(87) PCT Pub. No.: WO2022/180460

PCT Pub. Date: Sep. 1, 2022

(65) Prior Publication Data

US 2024/0088602 A1 Mar. 14, 2024

(30) Foreign Application Priority Data

Feb. 26, 2021 (JP) ................................ 2021-030491

(51) Int. Cl.
*H01R 13/52* (2006.01)
*H01R 12/78* (2011.01)
*H01R 12/77* (2011.01)

(52) U.S. Cl.
CPC ............ *H01R 13/52* (2013.01); *H01R 12/78* (2013.01); *H01R 12/774* (2013.01)

(58) Field of Classification Search
None
See application file for complete search history.

(56) References Cited

U.S. PATENT DOCUMENTS

| | | | |
|---|---|---|---|
| 4,519,659 | A | 5/1985 | Shiino |
| 2006/0234542 | A1 | 10/2006 | Ko |
| 2014/0193986 | A1 | 7/2014 | Venaleck |

FOREIGN PATENT DOCUMENTS

| | | | |
|---|---|---|---|
| JP | H06203927 | A | 7/1994 |
| JP | H07230859 | A | 8/1995 |
| JP | H07307175 | A | 11/1995 |
| JP | H0822870 | A | 1/1996 |
| JP | 2000223189 | A | 8/2000 |
| JP | 2001210410 | A | 8/2001 |
| JP | 2016046157 | A | 4/2016 |
| JP | 2017228416 | A | 12/2017 |

OTHER PUBLICATIONS

International Preliminary Report on Patentability received for PCT Application No. PCT/IB2022/050699, mailed on Sep. 7, 2023, 06 pages.
International Search Report and Written Opinion received for PCT Application No. PCT/IB2022/050699, mailed on Apr. 28, 2022, 07 pages.

*Primary Examiner* — Ross N Gushi

(57) ABSTRACT

The housing of the connector has insertion paths into which flat cables can be inserted. The connector also has a plurality of partition portions, which are formed of an elastic material. The partition portions are arranged along the insertion paths. When the flat cables are inserted into the insertion paths, the partition portions are positioned between the two adjacent conductor lines.

9 Claims, 21 Drawing Sheets

CONNECTOR AND CONNECTOR ASSEMBLY

CROSS-REFERENCE TO RELATED APPLICATION

This application is a U.S. National Phase Patent Application of International Patent Application No. PCT/IB2022/050699, filed on Jan. 27, 2022, which claims priority to Japanese Patent Application No. 2021-030491 filed on Feb. 26, 2021, both of which are incorporated herein by reference in their entireties.

TECHNICAL FIELD

The present disclosure relates to a connector and a connector assembly.

BACKGROUND ART

Conventionally, a connector has been used to connect a flexible flat cable to a circuit board. A plurality of conductor pads are exposed at the end of the cable. The connector has a plurality of terminals that come into contact with each of the plurality of conductor pads.

Prior Art Documents: Patent Documents: Patent Document 1: Japanese Unexamined Patent Application 2017-228416 and Patent Document 2: Japanese Unexamined Patent Application 2016-46157.

SUMMARY

If a circuit board is used in an environment exposed to the outside air, condensation may form inside the connector due to changes in temperature. Moisture resulting from condensation can cause a reduction in insulation between two adjacent conductor pads.

A method of supplying resin to the inside and outside of the connector at the portion where the conductor pads are provided to block outside air to prevent reduction in insulative properties due to condensation is available. However, this method increases the work involved in connecting the flat cable to the circuit board. Also, even if the outside air is blocked, completely preventing condensation in the connector is difficult.

The connector proposed in the present disclosure has a housing having an insertion path into which a flat cable having a first surface on which a plurality of conductor lines aligned in a first direction are formed can be inserted in a second direction, and a plurality of partition portions aligned in the first direction, formed of an elastic material. Each of the plurality of partition portions is arranged along the insertion path, is contactable to the first surface when the flat cable is inserted into the insertion path, and is positioned between two adjacent conductor lines. This connector prevents reduction in insulation between two adjacent conductor lines formed on a flat cable.

The connector assembly proposed in the present disclosure includes a first connector having a housing with an insertion path into which a flat cable having a first surface on which a plurality of conductor lines aligned in a first direction are formed can be inserted in a second direction, and a second connector having a housing retaining a plurality of terminals respectively aligned in the first direction and in contact with the plurality of conductor lines. One of the first connector and the second connector has a plurality of partition portions that are aligned in the first direction and formed of an elastic material, and each of the plurality of partition portions is arranged along the insertion path and positioned between two adjacent terminals of the plurality of terminals when the first connector and the second connector are connected. This connector assembly prevents reduction in insulation between two adjacent conductor lines formed on a flat cable.

DETAILED DESCRIPTION OF THE PREFERRED EMBODIMENTS

The connector assembly proposed in this disclosure is described below. Hereinafter, an X1 direction and X2 direction illustrated in FIG. 1, and the like are respectively referred to as a right direction and left direction, a Y1 direction and Y2 direction are respectively referred to as a frontward direction and backward direction, and a Z1 direction and Z2 direction are respectively referred to as an upward direction and downward direction. These directions are defined to describe the relative positioning of the parts of the connector and connector assembly, and do not limit their orientation when the connector and connector assembly are mounted on other devices.

Figure 1A:
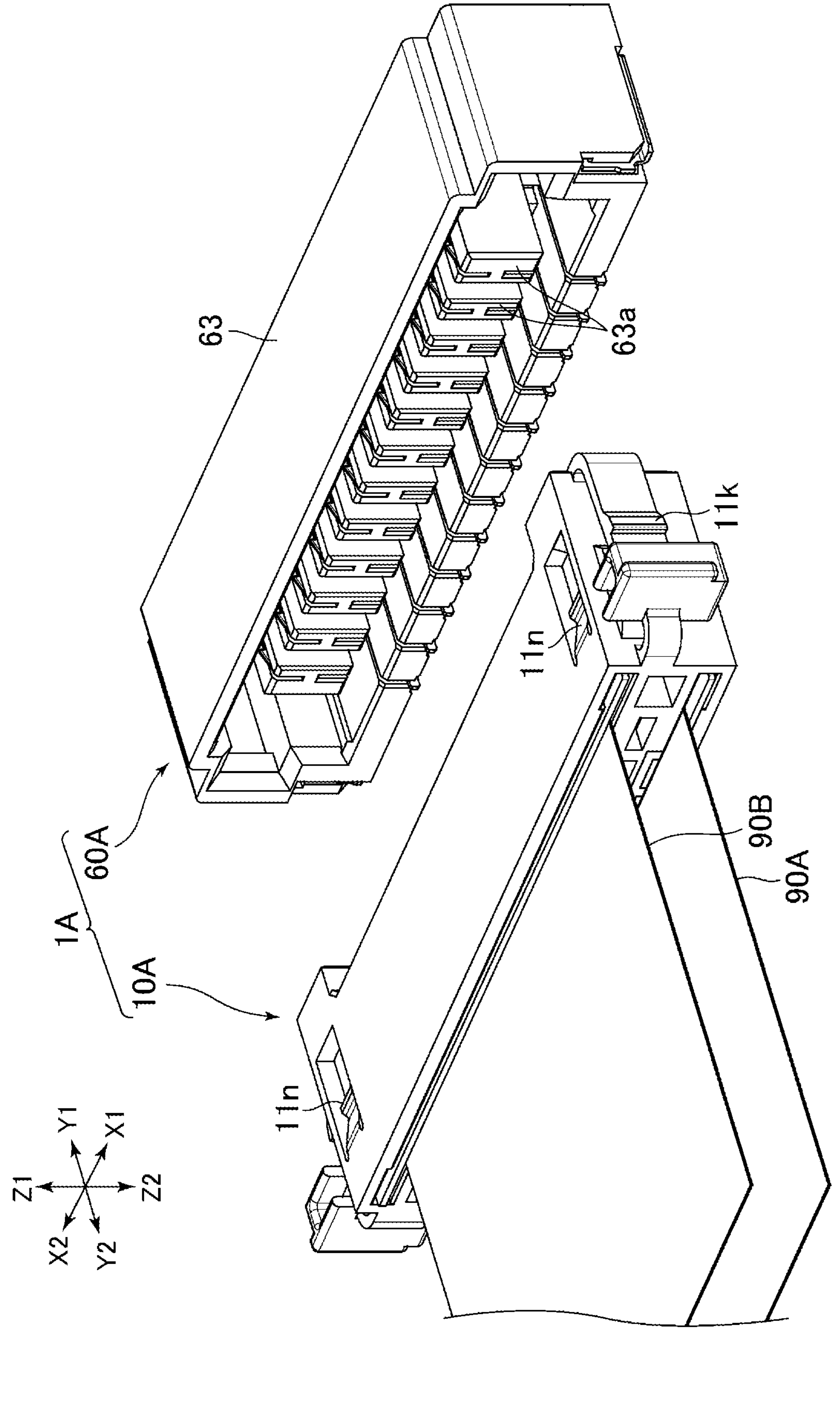
FIG. 1A is a perspective view illustrating an example of a connector assembly according to the present disclosure.
Figure 1B:
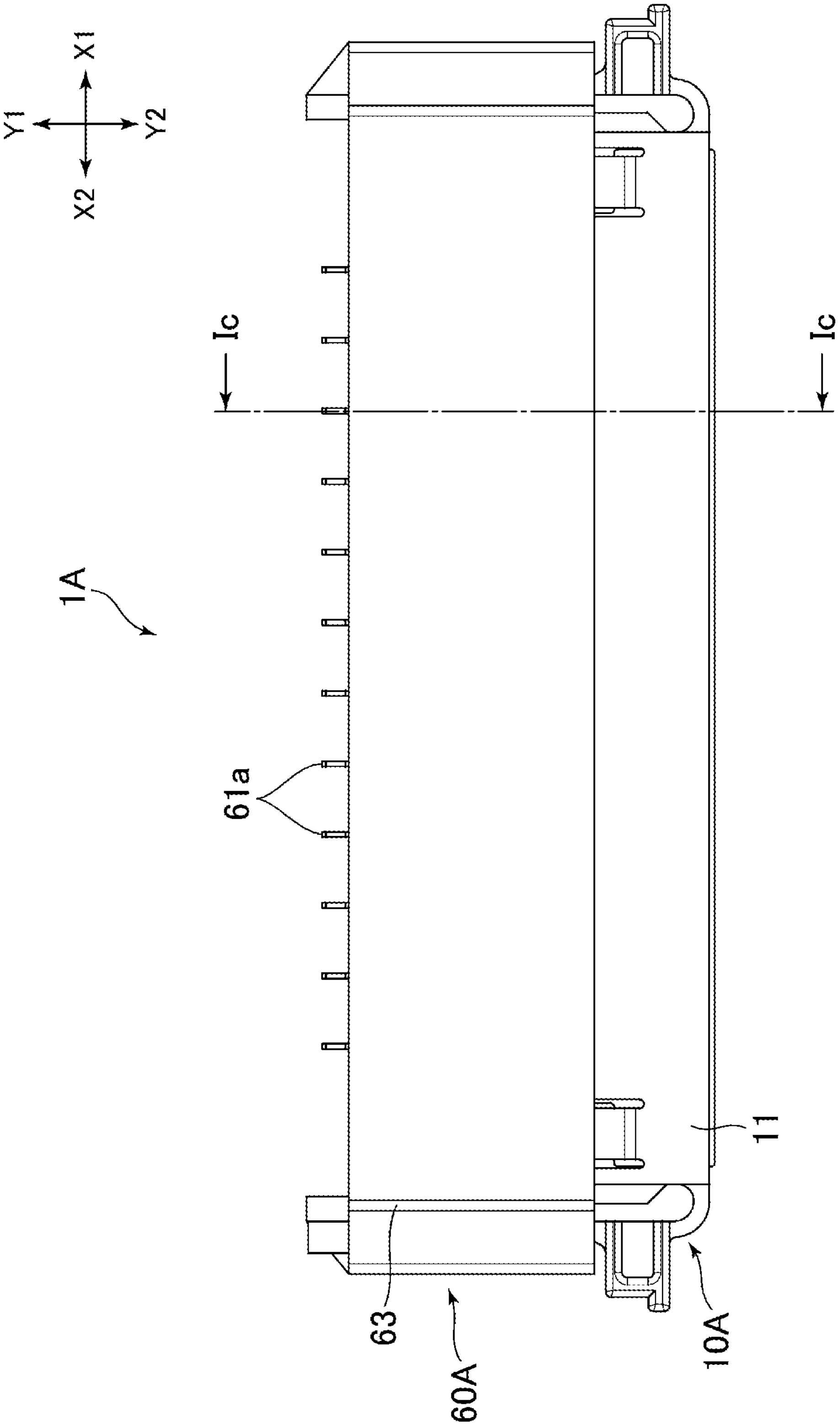
FIG. 1B is a plan view of the connector assembly illustrated in FIG. 1A.

As illustrated in FIG. 1A, the connector assembly 1A may have a first connector 10A and a second connector 60A. The first connector 10A and the second connector 60A may be mated in a front-to-back direction.

A flat cable is inserted into the first connector 10A. In the example illustrated in FIG. 1A, two flat cables 90A and 90B are inserted into the first connector 10A. The two flat cables 90A and 90B are arranged facing each other in the up-down direction. The number of flat cables attached to the first connector 10A may be either one or more than two as well. Also, the posture (orientation) of the flat cables 90A and 90B is not limited to the example described here. For example, the two flat cables 90A and 90B may be arranged with the same orientation. (In other words, both of the conductor pads 91*a* described below of the two flat cables 90A and 90B may face downward or upward.)

Flat cables 90A and 90B include, for example, a flexible cable (Flexible Flat Cable), a flexible circuit board (Flexible Printed Circuit), and a rigid circuit board (Printed Circuit Board).

Figure 1C:
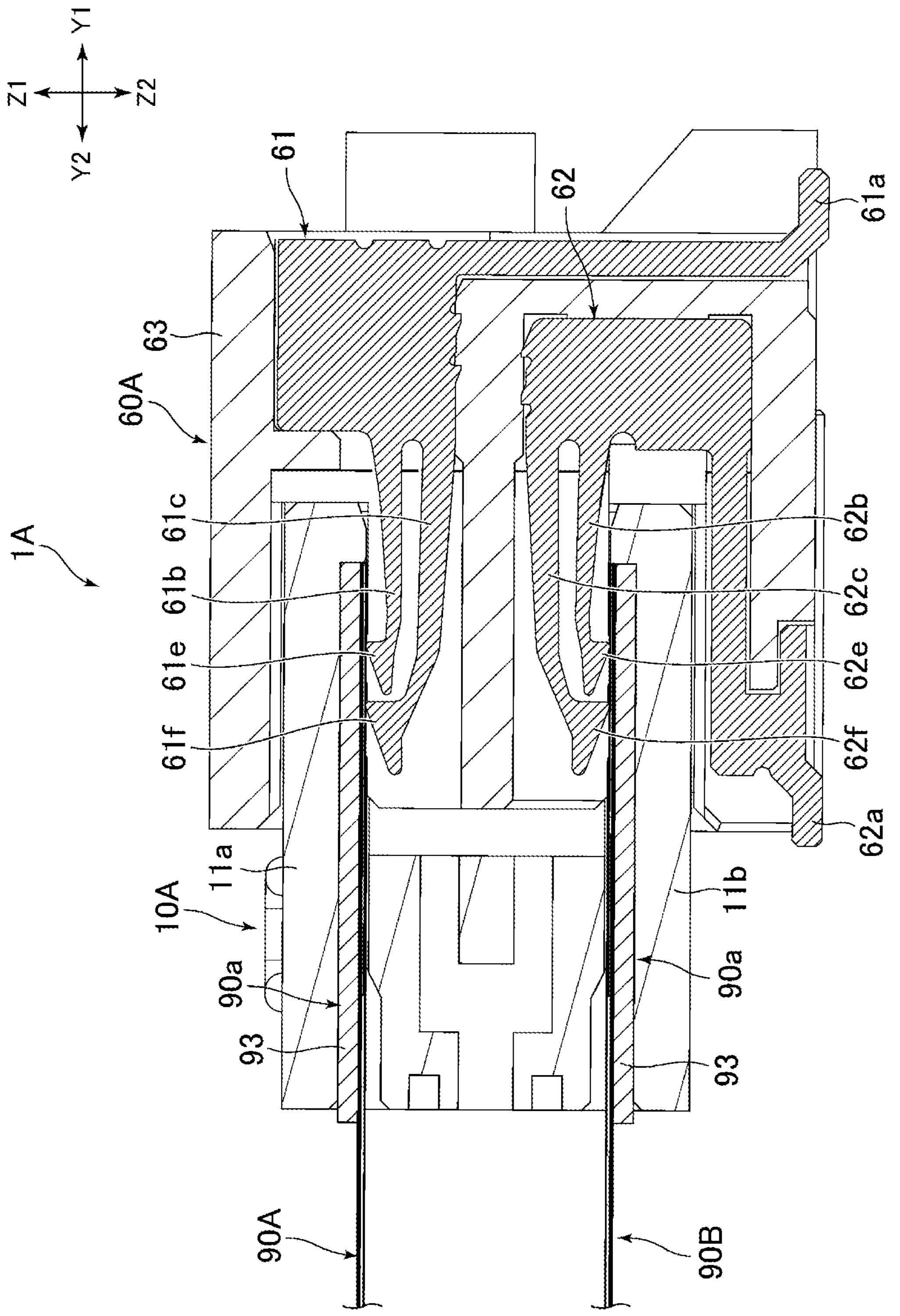
FIG. 1C is a cross section view along line Ic-Ic in FIG. 1B.
Figure 2A:
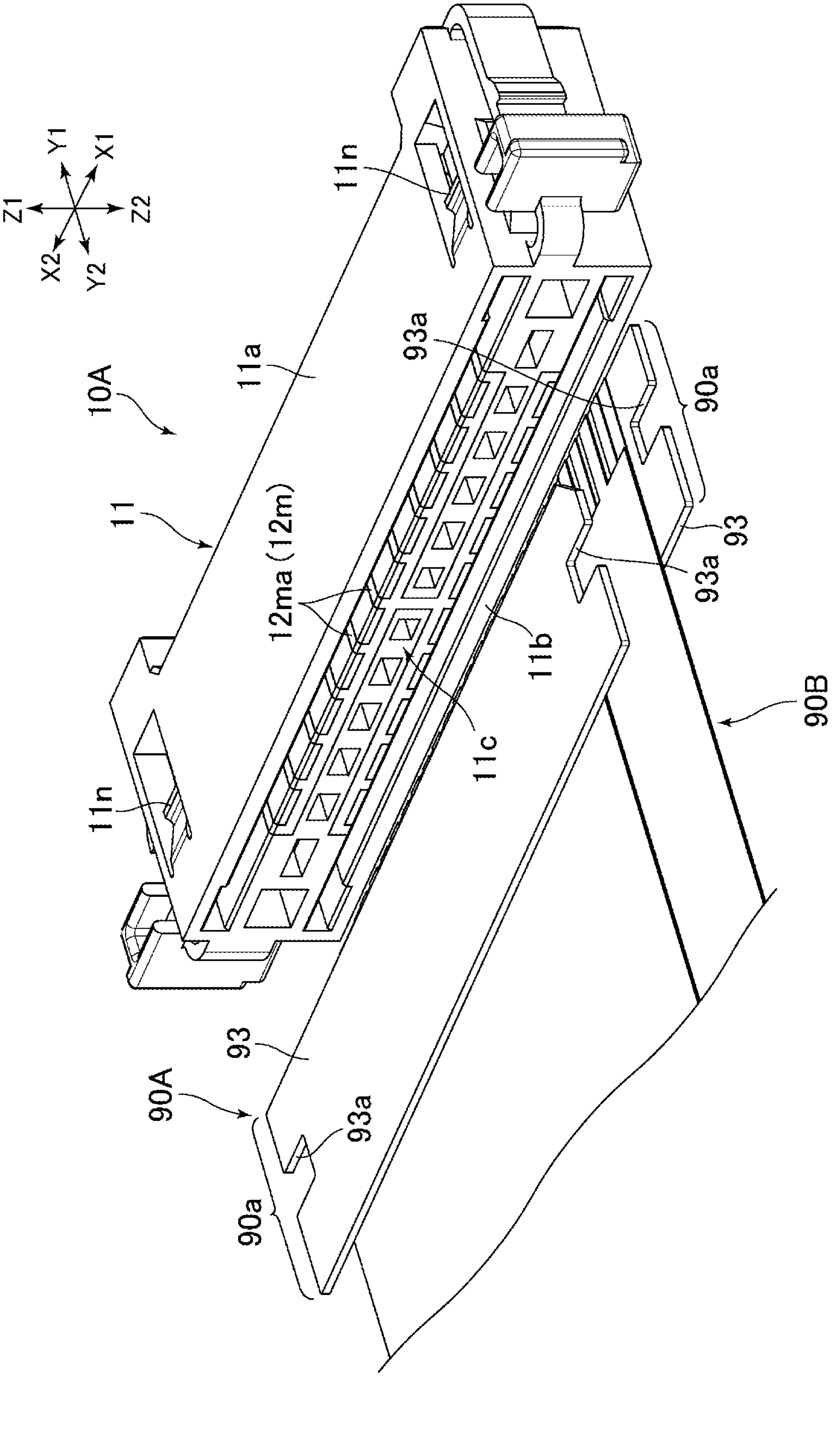
FIG. 2A is a perspective view illustrating an example of a connector according to the present disclosure.
Figure 2B:
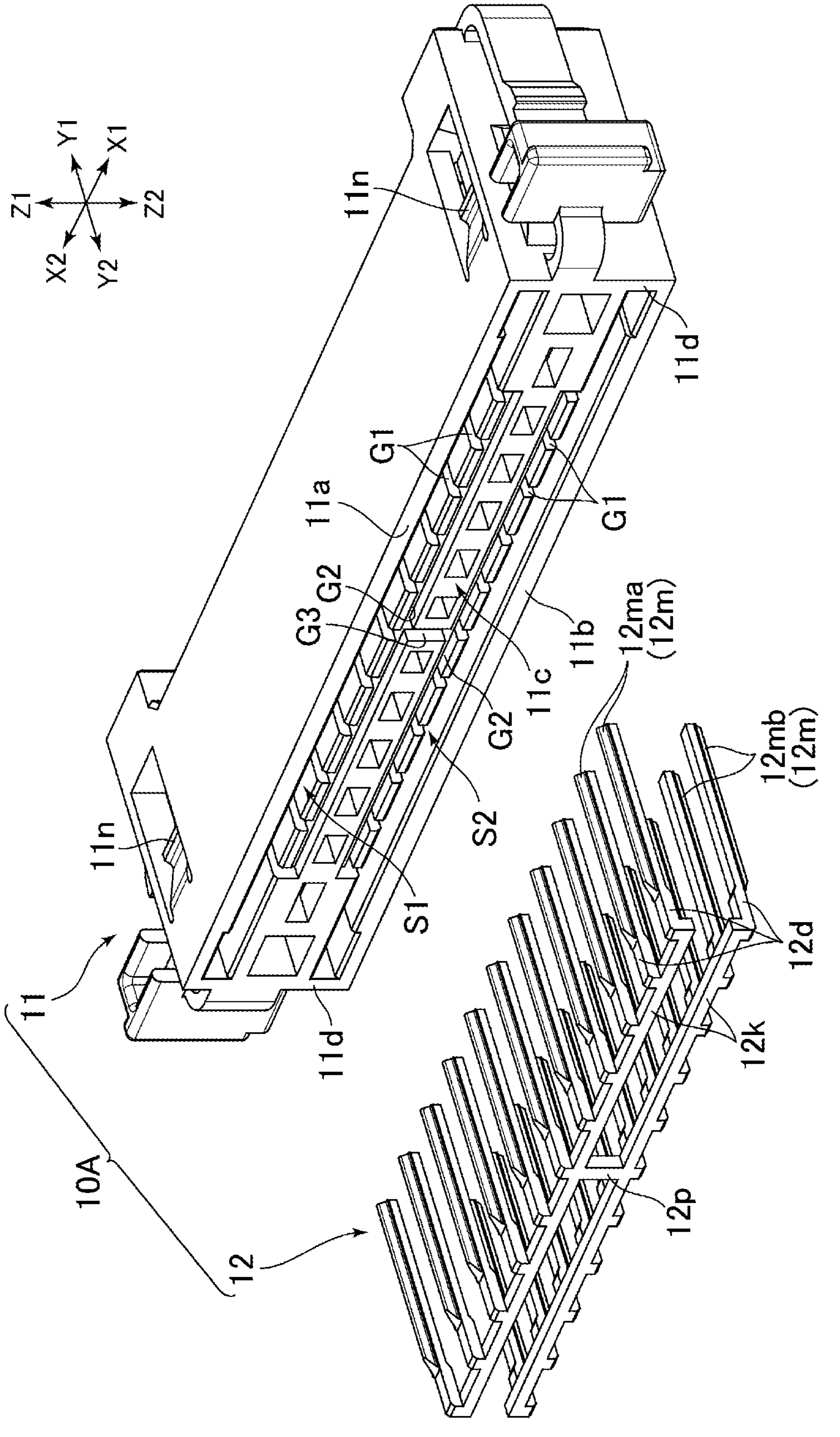
FIG. 2B is an exploded perspective view of the connector illustrated in FIG. 2A.
Figure 2C:
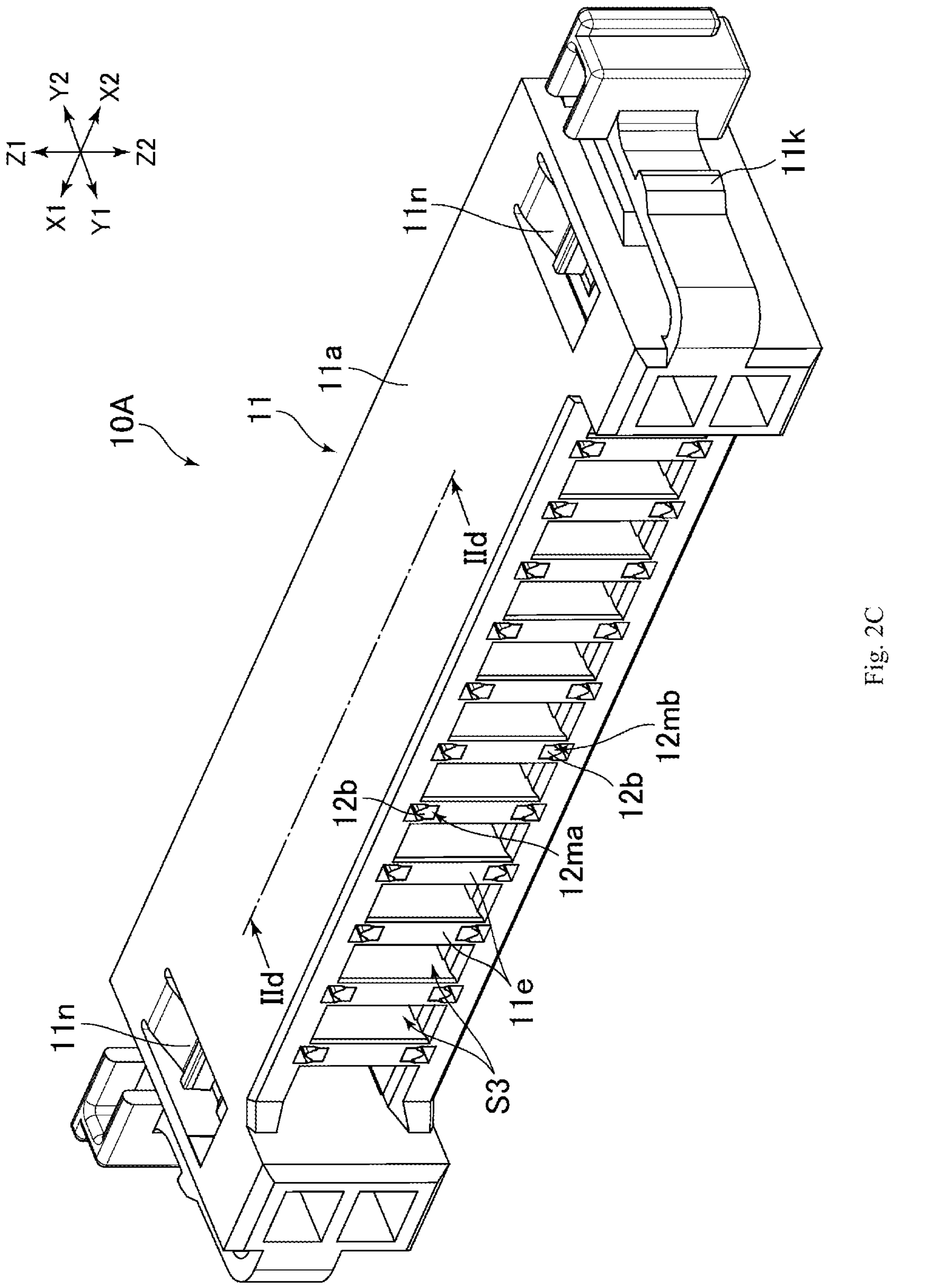
FIG. 2C is a perspective view of the connector illustrated in FIG. 2A facing diagonally from the front side.
Figure 2D:
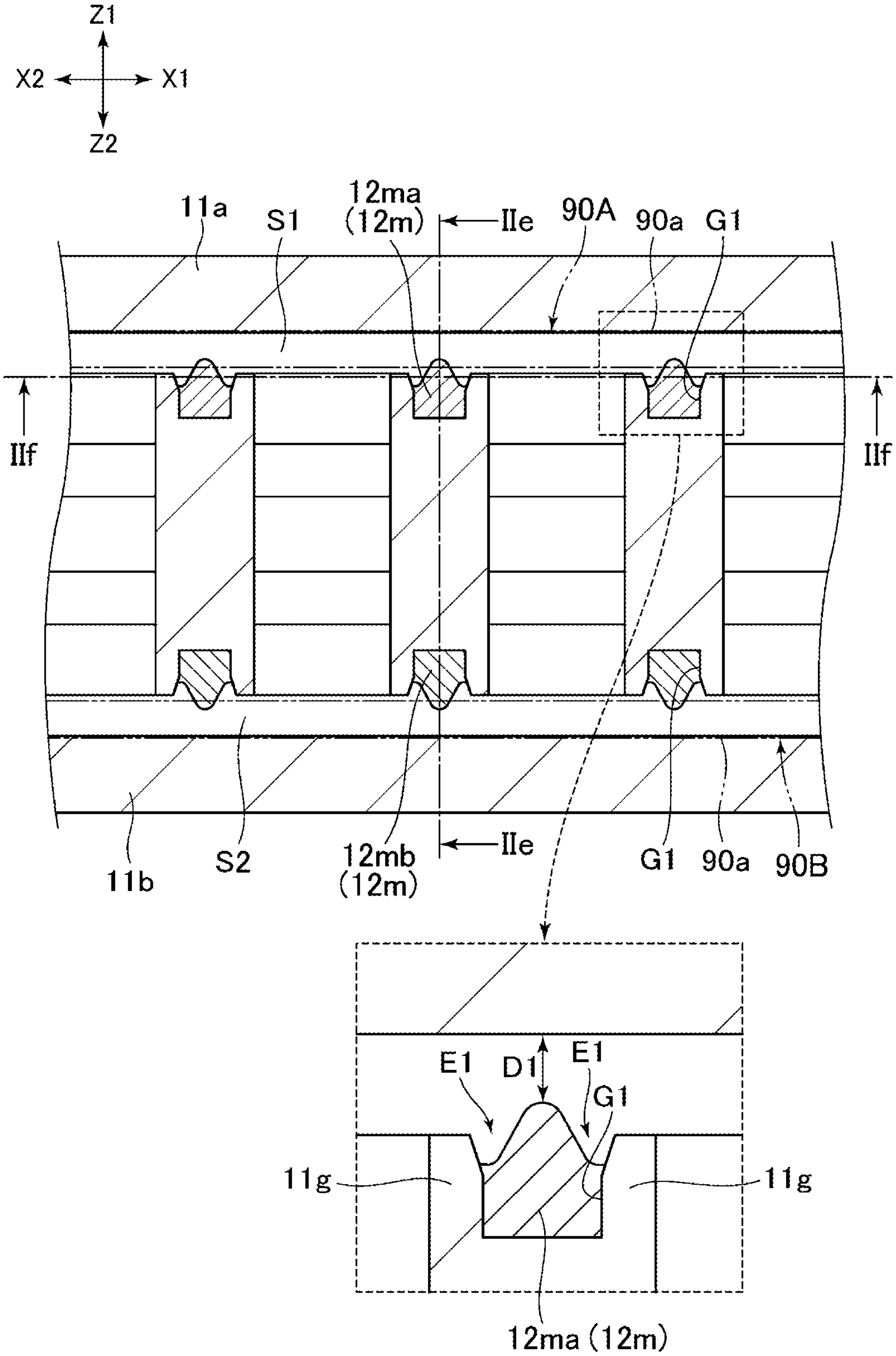
FIG. 2D is a cross-sectional view of the connector obtained along the line IId-IId illustrated in FIG. 2C.
Figure 2E:
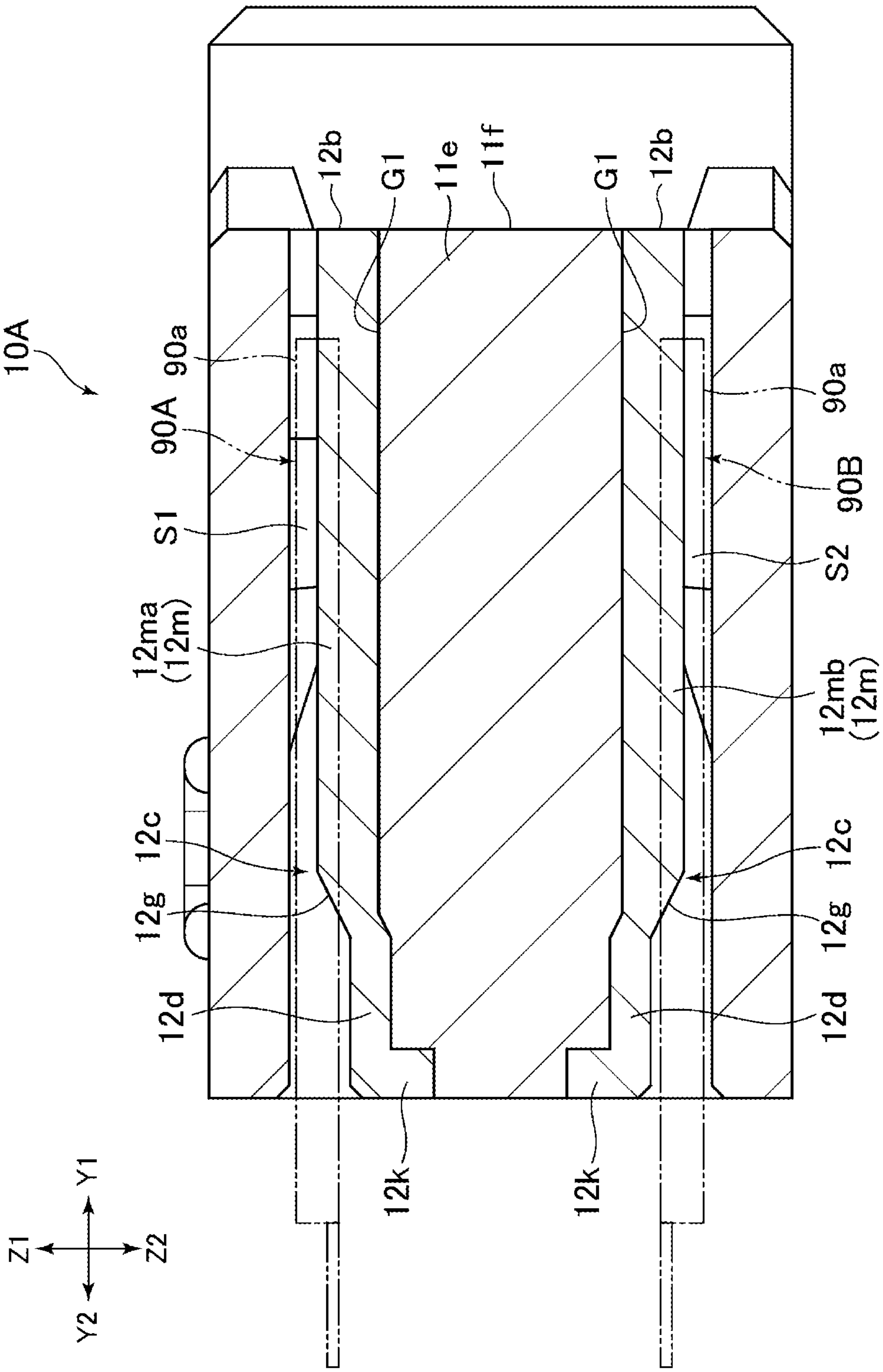
FIG. 2E is a cross-sectional view of the connector obtained along the line IIe-IIe illustrated in FIG. 2D.
Figure 2F:
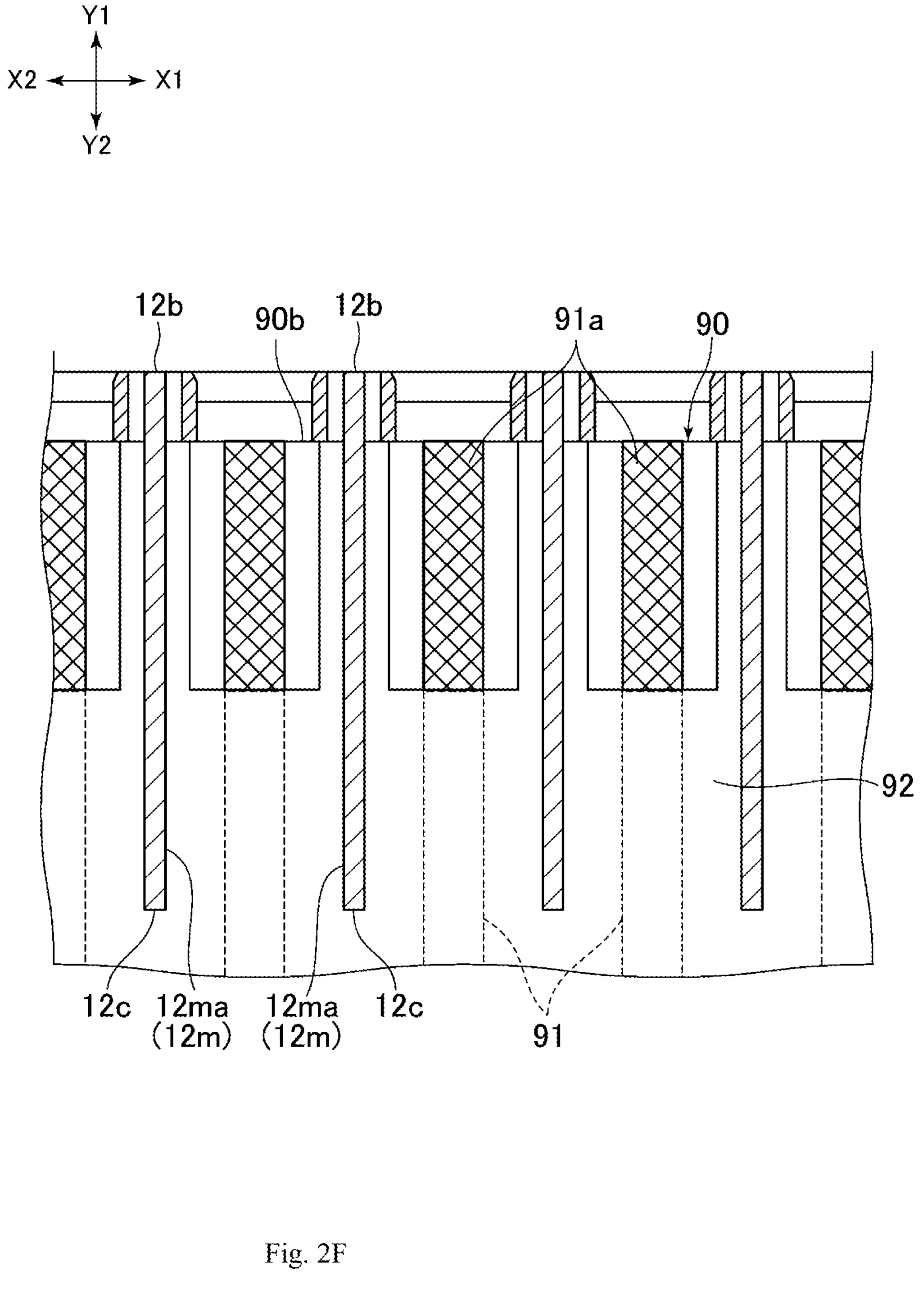
FIG. 2F is a cross-sectional view of the connector obtained along the line IIf-IIf illustrated in FIG. 2F.

Flat cables 90A and 90B have a plurality of conductor lines 91 on one side of the base material thereof that are aligned in the left-right direction (first direction) (FIG. 2F). As illustrated in FIG. 2F, the flat cables 90A and 90B have a coating layer 92 covering the conductor lines 91. Each conductor line 91 has a conductor pad 91*a* at the end thereof, which is exposed through the coating layer 92. Terminals 61 and 62 (see FIG. 1C) of the second connector 60A come into contact with the conductor pads 91*a*. Also, the flat cables 90A and 90B may have a reinforcement plate 93 (see FIG. 2A) at the end thereof. Note, the positions of the conductor pads 91*a* adjacent in the left-right direction illustrated in FIG. 2F may be shifted or staggered in the front-to-back direction.

As illustrated in FIG. 2A, the flat cables 90A and 90B may have an engaging portion 93*a*. The engaging portion 93*a* is, for example, a recess formed on the left and right edges of the reinforcement plate 93. A housing 11 may have an engaging portion 11*n* that engages with the engaging portion 93*a*.

The second connector 60A is a connector that is mounted on a circuit board (not shown). The connector assembly 1A may be used to connect the flat cables 90A and 90B to the circuit board. The first connector 10A and the second connector 60A may be mated in a direction parallel to the circuit board.

As illustrated in FIG. 1C, the second connector 60A has a plurality of terminals 61 and 62 and a housing 63 for retaining the terminals 61 and 62. The plurality of terminals 61 and plurality of terminals 62 are aligned in the left-right direction. Unlike the example described here, the second connector 60A may have one type of terminal, or more than two types as well.

As illustrated in FIG. 1C, terminals 61 and 62 may have a connecting part 61*a* and 62*a*, respectively, for connecting to a conducting portion formed on the circuit board. The connecting part 61*a* of terminal 61 is located at the front side of the housing 63 (opposite the first connector 10A) of the second connector 60A, and the connecting part 62*a* of terminal 62 is located at the back side of the housing 63 (first connector 10A side). The terminals 61 and 62 may have elastic portions 61*b*, 61*c*, 62*b*, and 62*c* that extend toward the back (first connector 10A side). The terminal 61 may have two elastic portions 61*b* and 61*c*, and the terminal 62 may also have two elastic portions 62*b* and 62*c*. The elastic portions 61*b* and 61*c* have contact portions 61*e* and 61*f* at the back portions thereof for contacting the conductor pads 91*a* of the flat cable 90A. The elastic portions 62*b* and 62*c* have contact portions 62*e* and 62*f* at the back portions thereof for contacting the conductor pads 91*a* of the flat cable 90B.

As illustrated in FIG. 1A, the housing 63 may be open toward the back (first connector 10A side). The housing 63 may have a plurality of mating portions 63*a* inside the opening, aligned in the left-right direction. The upper part of each mating portion 63*a* may have a groove formed in which the elastic portions 61*b* and 61*c* of the terminal 61 are placed, and the lower part of each mating portion 63*a* may have a groove formed in which the elastic portions 62*b* and 62*c* of the terminal 62 are placed. The plurality of mating portions 63*a* each fit into the mating holes S3 (see FIG. 2C) of the first connector 10A, which will be described later.

As illustrated in FIG. 2B, the first connector 10A has a housing 11. The housing 11 has insertion paths S1 and S2 (see FIG. 2D) into which the flat cables 90A and 90B can be inserted. The portions of the flat cables 90A and 90B where the reinforcement plates 93 (see FIG. 2A) are provided may be inserted into the insertion paths S1 and S2. (In the following, the portion to be inserted into the insertion paths S1 and S2 is referred to as the inserted part 90*a*.)

A plurality of insertion paths S1 and S2 may be formed in the housing 11. In the example illustrated in the diagram, the housing 11 has an insertion path S1 formed in the upper part thereof and an insertion path S2 formed in the lower part thereof (see FIG. 2D). The number of insertion paths formed in the housing 11 corresponds to the number of flat cables. For example, the number of insertion paths formed in the housing 11 may be one or more than two as well.

As illustrated in FIG. 1A, the housing 11 may have a locked to portion 11*k*. In the example illustrated in the diagram, the housing 11 has a locked to portion 11*k* on the right side and the left side thereof. The housing 63 of the second connector 60A may have a locking portion that engages with the locked to portion 11*k* and prevents separation of the first connector 10A and the second connector 60A.

As illustrated in FIG. 2B, the first connector 10A may have a plurality of partition portions 12*ma* and 12*mb*, which are arranged along the insertion paths S1 and S2 and aligned in the left-right direction. In the example illustrated in the diagram, the first connector 10A has an elastic body 12. The partition portions 12*ma* and 12*mb* can be part of the elastic body 12. The elastic body 12 is formed of an elastic material, such as elastomer, silicone, or rubber.

The partition portions 12*ma* and 12*mb* face one side of the flat cables 90A and 90B (specifically, the side where the conductor pads 91*a* are exposed). As illustrated in FIG. 2E, the partition portion 12*ma* located along the insertion path S1 may be located at the bottom of the insertion path S1, and the partition portion 12*mb* located along the insertion path S2 may be located at the top of the insertion path S2.

As illustrated in FIG. 2F, the partition portion 12*ma* is located between two adjacent conductor lines 91 of the flat cable 90A. More specifically, the partition portion 12*ma* is located between the conductor pads 91*a* of two adjacent conductor lines 91. In the state where the first connector 10A and the second connector 60A are mated, the partition portion 12*ma* is located between two adjacent terminals 61. When the inserted part 90*a* of the flat cable 90A is placed in the insertion path S1, the partition portion 12*ma* is pressed against the inserted part 90*a* and deforms elastically. With this structure, even if condensation occurs in the housing 11, electrical connection of two adjacent conductor lines 91 can be suppressed without special processing of the flat cable or enlargement of the connector.

The partition portion 12*mb* located along the insertion path S2 is located between the conductor pads 91*a* of the two adjacent conductor lines 91 on the flat cable 90B similar to the partition portion 12*ma*. When the inserted part 90*a* of the flat cable 90B is placed in the insertion path S2, the partition portion 12*mb* is pressed against the inserted part 90*a* and deforms elastically. (In the following, the sign 12*m* is used for the partition portion in the description common to the partition portion 12*ma* and the partition portion 12*mb*.)

As illustrated in FIG. 2F, the partition portion 12*m* has a front end (the end on the second connector 60A side) 12*b* and a back end 12*c*. When the inserted part 90*a* of the flat cables 90A and 90B are placed in the insertion paths S1 and S2, the position of the conductor pads 91*a* in the front-to-back direction is between the front end 12*b* and the back end 12*c*. In other words, the partition portion 12*m* has a portion located in front of the front edge of the conductor pads 91*a* and a portion located behind the back end of the conductor pads 91*a*. This effectively suppresses electrical connection of two adjacent conductor lines 91 due to condensation.

In the state where the first connector 10A and the second connector 60A are mated, the position of the contact portions 61*e*, 61*f*, 62*e*, and 62*f* of the terminals 61 and 62 in the front-to-back direction is between the front end 12*b* and the back end 12*c* of the partition portion 12*m*.

As illustrated in FIG. 2F, the back end 12*c* of the partition portion 12*m* is farther back from the conductor pads 91*a*, and the distance in the front-to-back direction between the back end 12*c* and the conductor pads 91*a* is greater than the distance between a front edge 90*b* of the flat cable 90A and the front end 12*b* of the partition portion 12*m*. This effectively suppresses the back part of the two adjacent conductor lines 91 from connecting due to condensation. The position of the back end 12*c* should be set so that the distance between the back end of the conductor pads 91*a* and the back end 12*c* of the partition portion 12*m* is greater than the distance in the left-right direction between adjacent conductor pads 91*a*. In addition to the aforementioned effects, this enables the distance between adjacent conductor pads 91*a*, in other words, the creepage distance and clearance distance between adjacent conductor pads 91*a*, to be further increased, avoiding the partition portion 12*m*.

As illustrated in FIG. 2F, the front end 12*b* of the partition portion 12*m* is located further forward than the front edge 90*b* of the flat cable 90A. This more reliably suppresses the front end of the two adjacent conductor lines 91 from connecting due to condensation.

In the first connector 10A, the back ends 12*c* of the two adjacent partition portions 12*m* are not connected and are open to the back. Unlike the first connector 10A, the elastic body 12 may have a portion that connects the back ends 12*c* of two adjacent partition portions 12*m*. (In the following, this part is referred to as the "back sealing portion.") Each conductor pad 91*a* may be surrounded by two adjacent partition portions 12*ma* and the back sealing portion. Similar to the partition portion 12*m*, the back sealing portion may be pressed against and elastically deformed by the inserted part 90*a* of the flat cables 90A and 90B when the inserted part 90*a* is placed in the insertion paths S1 and S2.

As illustrated in FIG. 2D, the housing 11 has an upper wall portion 11*a* that faces the upper surface of the upper flat cable 90A. The distance D1 between the upper wall portion 11*a* and the partition portion 12*ma* in the vertical direction, which is the thickness direction of the flat cable 90A, is smaller than the thickness of the inserted part 90*a* of the flat cable 90A. (In this description, the distance D1 is the distance between the top of the partition portion 12*ma* and the bottom of the upper wall portion 11*a*.) Therefore, when the operator inserts the inserted part 90*a* of the flat cable 90A into the insertion path S1, the inserted part 90*a* contacts the lower surface of the upper wall portion 11*a*, and the partition portion 12*ma* is pressed against the lower surface of the inserted part 90*a*, causing elastic deformation.

As illustrated in FIG. 2D, the housing 11 has a lower wall portion 11*b* that faces the lower surface of the lower flat cable 90B. The distance between the lower wall portion 11*b* and the partition portion 12*mb* is also smaller than the thickness of the inserted part 90*a* of the flat cable 90B. Therefore, when the operator inserts the inserted part 90*a* of the flat cable 90B into the insertion path S2, the inserted part 90*a* contacts the upper surface of the lower wall portion 11*b*, and the partition portion 12*mb* is pressed against the upper surface of the inserted part 90*a*, causing elastic deformation.

As illustrated in FIG. 2E, the partition portion 12*m* may have a sloped surface 12*q* at the back end thereof (the end 12*c* on the side that receives the flat cables 90A and 90B). With this sloped surface 12*q*, the work of inserting the flat cables 90A and 90B into the insertion paths S1 and S2 can be simplified.

Unlike the first connector 10A, the distance D1 between the upper wall portions 11*a* and 11*b* and the partition portion 12*m* may be the same as the thickness of the inserted part 90*a* of the flat cables 90A and 90B or larger than the thickness of the inserted part 90*a*. In this case, the connector assembly 1A may include a member that is attached to the housing 11 and presses one of the inserted part 90*a* and the partition portion 12*m* against the other. This structure reduces the friction between the partition portion 12*m* and the flat cables 90A and 90B during the insertion process of the flat cables 90A and 90B. The forms thereof will be discussed in detail below.

The housing 11 is formed of a material that has a higher rigidity than the elastic body 12 of the partition portion 12*m*. As described above, the material of the elastic body 12 is an elastomer, silicone, rubber, or other elastic material. On the other hand, the housing 11 material can be any plastic, such as polycarbonate, polyamide, polybutylene terephthalate, liquid crystal polymers, and the like.

As illustrated in FIG. 2B, the housing 11 has a supporting portion 11*c*. An insertion path S1 is formed between the supporting portion 11*c* and the upper wall portion 11*a*. The insertion path S1 opens to the back side and receives the flat cable 90A through this opening. Similarly, the insertion path S2 is formed between the supporting portion 11*c* and the lower wall portion 11*b*. The insertion path S2 opens to the back side and receives the flat cable 90B through this opening.

The partition portions 12*ma* and 12*mb* are supported by the supporting portion 11*c*. Specifically, as illustrated in FIG. 2D and FIG. 2E, the partition portion 12*ma* is located on the upper side (insertion path S1 side) of the supporting portion 11*c*. A groove G1 extending along the front-to-back direction is formed on the upper side of the supporting portion 11*c*. The partition portion 12*ma* is placed in this groove G1. The partition portion 12*ma* is supported by a highly rigid part (supporting portion 11*c*) when the flat cable 90A is inserted into the insertion path S1. As a result, contact pressure between the partition portion 12*ma* and the flat cable 90A can be sufficiently ensured.

A similar structure may be provided for the partition portion 12*mb* along the insertion path S2. In other words, as illustrated in FIG. 2D and FIG. 2E, the partition portion 12*mb* along the insertion path S2 is located below the supporting portion 11*c* (insertion path S2 side). A groove G1 is formed on the lower side of the supporting portion 11*c*, and the partition portion 12*mb* is placed in this groove G1.

As illustrated in FIG. 2C, the supporting portion 11*c* has a plurality of supporting walls 11*e* aligned in the left-right direction at the front thereof (the portion on the second connector 60A side). A mating hole S3 is formed between the two adjacent supporting walls 11*e*. The groove G1 formed in the supporting portion 11*c* may continue from the front to the back of the supporting portion 11*c* (supporting wall 11*e*). In the example illustrated in the diagram, this groove G1 extends to the front of the housing 11 (front of the supporting wall 11*e*). The front end 12*b* of the partition portion 12*m* is exposed to the front. Unlike the first connector 10A, the partition portion 12*m* does not necessarily have to be exposed in front of the supporting wall 11*e*.

As illustrated in FIG. 2D, the supporting portion 11*c* has left and right side wall portions 11*g* in the groove G1 where the partition portion 12*m* is placed. The partition portion 12*m* is placed between these side wall portions 11*g*. With this structure, expansion of the partition portion 12*m* width is restricted, which makes it easier to ensure sufficient contact pressure between the partition portion 12*m* and the inserted part 90*a*. The same effect can be obtained by forming a groove in which the upper and lower grooves of the supporting portion 11*c* are integrated, in other words, forming a slit through the right side wall portion 11*g* and left side wall portion 11*g* in the vertical direction, forming an elastic body 12 in the slit, and forming a partition portion 12*m* at the upper and lower ends of the elastic body 12.

As illustrated in FIG. 2D, the upper part of the partition portion 12*ma* along the insertion path S1 is substantially triangular, and a gap E1 is secured between the upper part of the partition portion 12*ma* and the side wall portion 11*g*. The existence of this gap E1 allows for the necessary elastic deformation of the partition portion 12*ma*. Similarly, a gap is also secured between the lower part of the partition portion 12*mb* that is parallel to the insertion path S2 and the side wall portion 11*g* to allow the necessary elastic deformation of the partition portion 12*mb*.

The placement of the partition portion 12*m* is not limited to the example of the first connector 10A. For example, if the conductor pads 91*a* of the flat cable 90*a* are exposed on the upper surface of the flat cable 90*a*, the partition portion 12*ma* may be formed on the lower surface of the upper wall portion 11*a* of the housing 11. Similarly, if the conductor pads 91*a* of the flat cable 90B are exposed on the bottom surface of the flat cable 90B, the partition portion 12*mb* may be formed on the bottom surface of the lower wall portion 11*b* of the housing 11.

As illustrated in FIG. 2B, a plurality of partition portions 12*m* aligned in the left-right direction may be interconnected. According to this structure, manufacturing of the first connector 10A can be simplified by forming the plurality of partition portions 12*m* at the same time. In the example illustrated in the diagram, the elastic body 12 may have a transverse connection 12*k* that extends in the left-right direction and connects the plurality of partition portions 12*m*. The elastic body 12 has an extended portion 12*d* that extends backward from each partition portion 12*m* and reaches the back surface of the supporting portion 11*c*. The transverse connection 12*k* may, for example, connect the back ends of the extended portions 12*d* that are aligned in the left-right direction.

As illustrated in FIG. 2B, the elastic body 12 may further have a vertical connection 12P. The vertical connection 12P may, for example, connect the plurality of partition portions 12*ma* to the transverse connection 12*k*, and may connect the plurality of partition portions 12*mb* to the transverse connection 12*k*. In the example illustrated in the diagram, the elastic body 12 has a vertical connection 12P at the center in the left-right direction. Therefore, regarding the first connector 10A, all the partition portions 12*ma* and 12*mb* are interconnected. This further simplifies manufacturing of the first connector 10A, since all the partition portions 12*m* can be formed at once.

The elastic body 12 may be formed in the housing 11 using two-color molding. In other words, the housing 11 may be molded in the primary mold, and then the housing 11 may be placed in the secondary mold, and the elastic body 12 may be molded using that secondary mold. In this manner, the first connector 10A can be molded efficiently.

To achieve such two-color molding, the supporting portion 11*c* of the housing 11 may have grooves G1 extending in the front-to-back direction to form the partition portion 12*m* and the extended portion 12*d*, grooves G2 extending in the left-right direction to form the transverse connection 12*k*, and grooves G3 connecting the upper groove G2 and the lower groove G2 and forming the vertical connection 12*p*, as illustrated in FIG. 2B. These grooves G1, G2, and G3 may be interconnected. The inner surface of each groove G1, G2, and G3 may have concave or convex portions in order to securely support the elastic body 12 in the groove (to prevent separation of the elastic body 12 from the groove).

Unlike the first connector 10A, the elastic body 12 may be formed separately from the housing 11 and attached to the supporting portion 11*c*. In this case, the elastic body 12 can be adhered to the supporting portion 11*c* or have a portion that engages with the housing 11 (in other words, a tab).

Unlike the connector assembly 1A illustrated in FIG. 1A or the like, the connector assembly may include a pressing member that presses the flat cables 90A and 90B toward the partition portion 12*ma* and 12*mb*. In this case, an opening may be formed in the upper wall portion 11*a* and 11*b* of the housing 11 to fit this pressing member. When the pressing member is attached to the housing 11, the partition portion 12*m* may be pressed against the flat cables 90A and 90B and elastically deformed. With this structure, the height of the insertion paths S1 and S2 in the thickness direction of the flat cables 90A and 90B can be increased. As a result, friction between the flat cables 90A and 90B and the partition portion 12*m* can be reduced when the flat cables 90A and 90B are inserted.

Figure 3A:
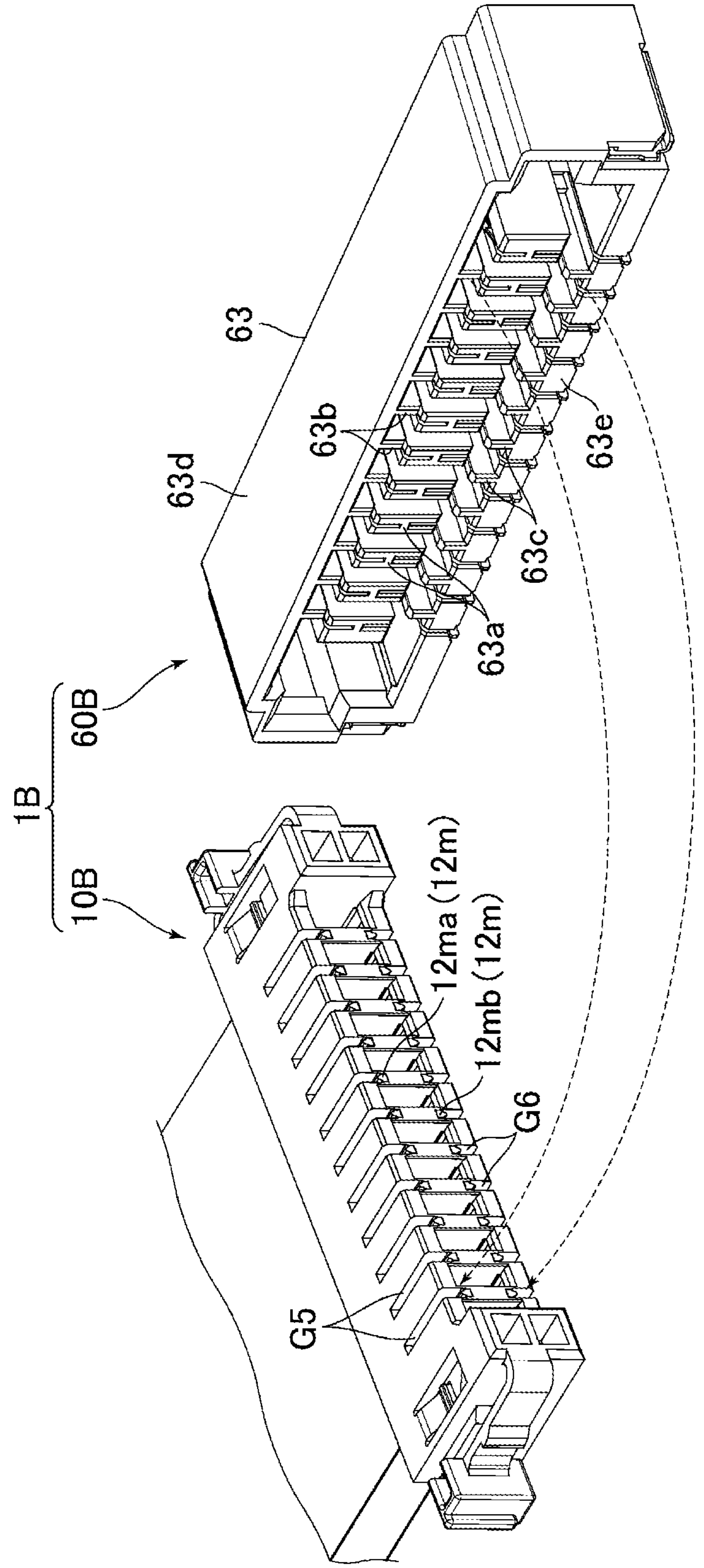
FIG. 3A is a perspective view illustrating a second example of a connector assembly according to the present disclosure.
Figure 3B:
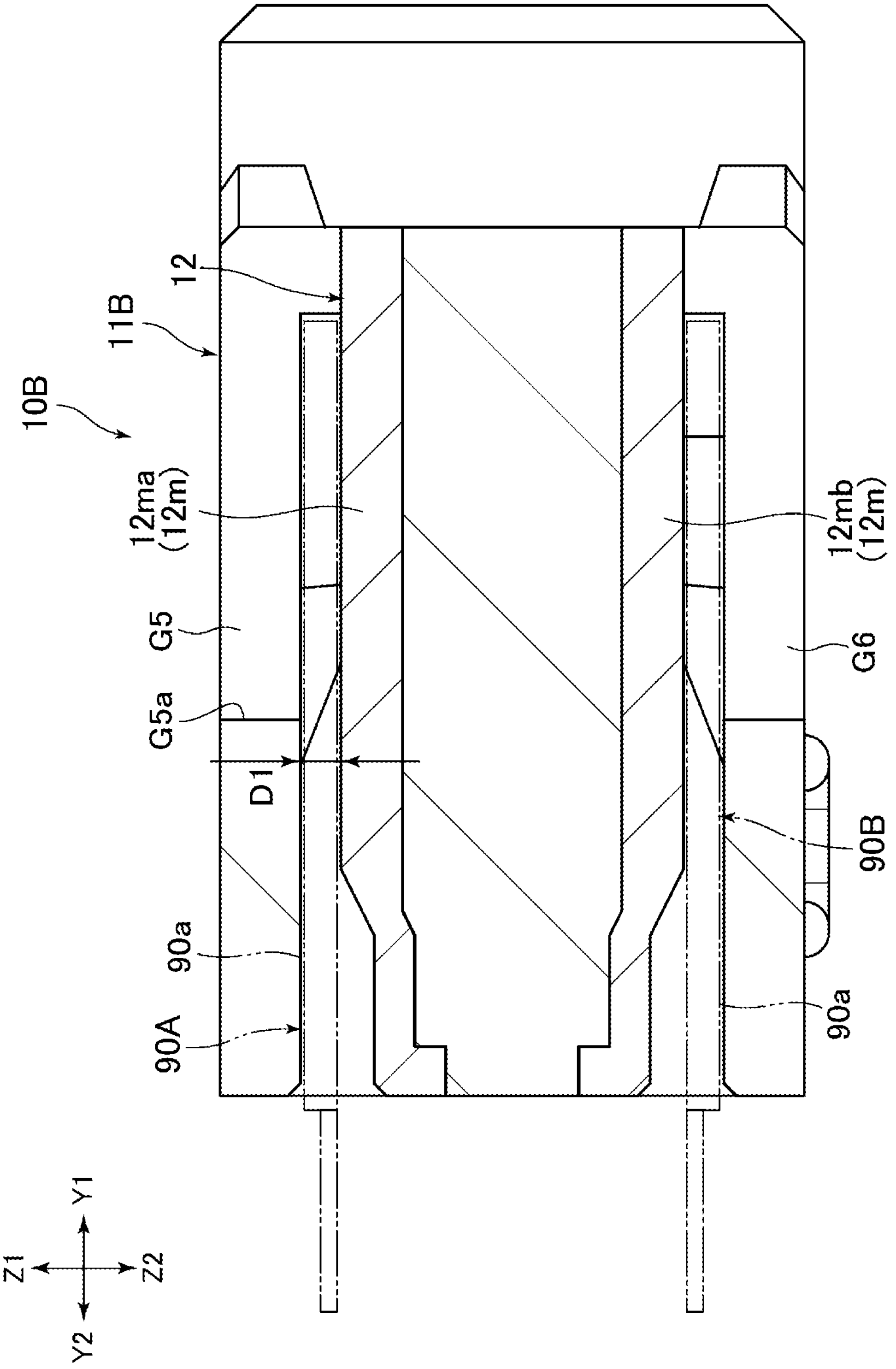
FIG. 3B is a cross-sectional view of a first connector of the connector assembly illustrated in FIG. 3A.
Figure 3C:
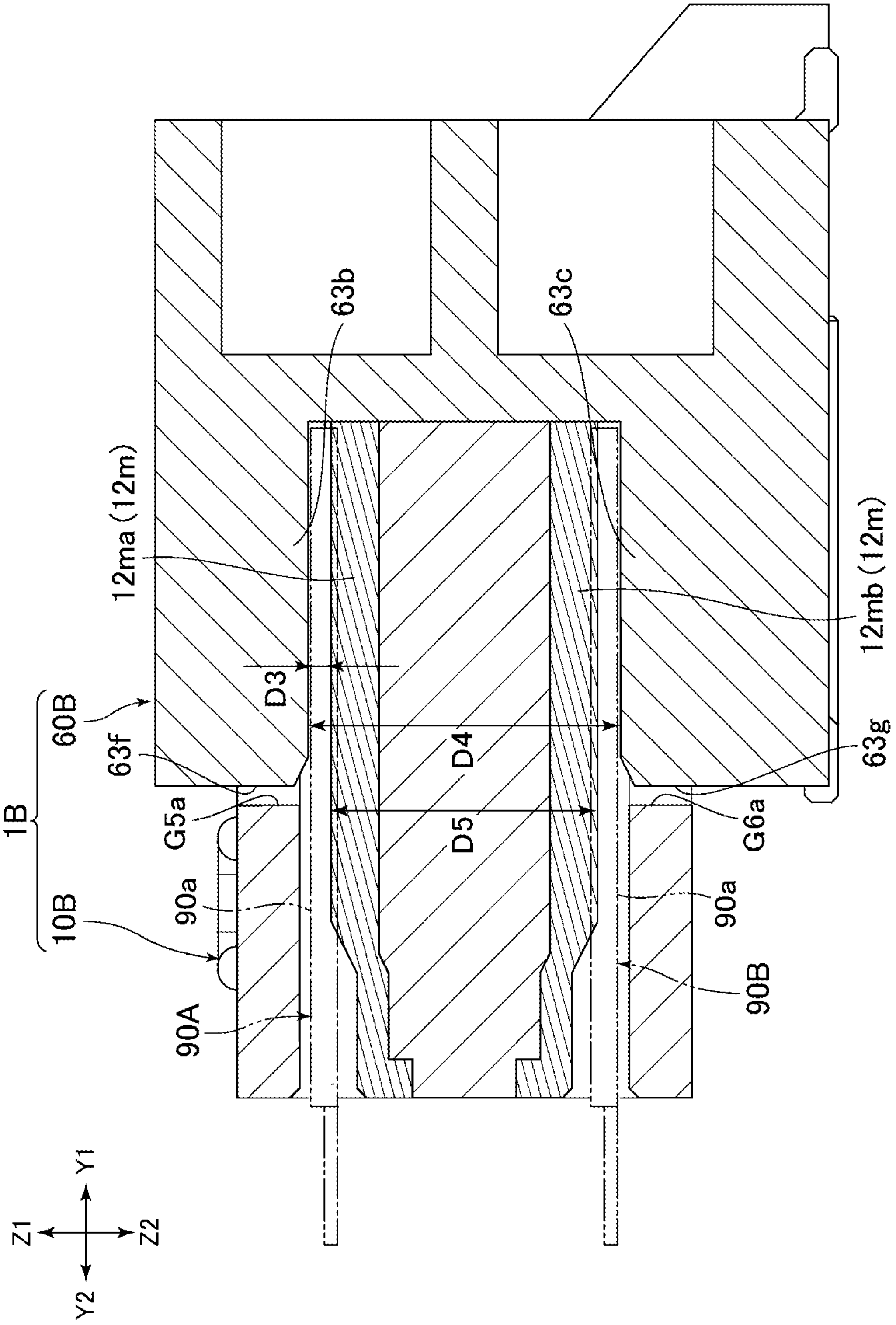
FIG. 3C is a cross-sectional view of the first connector and a second connector of the connector assembly illustrated in FIG. 3A.

FIG. 3A to FIG. 3C illustrate the connector assembly 1B as an example of a connector assembly with this manner of structure. In the connector assembly 1B, the second connector 60B is used as a pressing member. In the following, the focus is on the differences between the connectors 10A and 60A of the connector assembly 1A described with reference to FIG. 2A and the connectors 10B and 60B of the connector assembly 1B. Items not described for connectors 10B and 60B may be the same as for connectors 10A and 60A.

The first connector 10B of the connector assembly 1B has a housing 11B and an elastic body 12 having a partition portion 12*m*, similar to the first connector 10A illustrated in FIG. 2A and the like. An opening G5 may be formed in the upper wall portion 11*a* of the housing 11B. As illustrated in FIG. 3A, the upper wall portion 11*a* has a plurality of openings G5 that are aligned in the left-right direction, for example. The opening G5 is an elongated groove in the front-to-back direction. The positions of the plurality of openings G5 correspond to the positions of the plurality of partition portions 12*ma*. The opening G5 opens upward and forward, and the partition portion 12*ma* is exposed above the opening G5 as illustrated in FIG. 3*b*. The distance D1 between the upper wall portion 11*a* and the partition portion 12*ma* (see FIG. 3B) may be substantially the same as the inserted part 90*a* of the flat cable 90A, or larger than the thickness of the inserted part 90*a*.

The lower wall portion 11*b* may have the same structure as the upper wall portion 11*a*. In other words, as illustrated in FIG. 3B, the lower wall portion 11*b* may have a plurality of openings G6 that are aligned in the left-right direction. The positions of the plurality of openings G6 correspond to the positions of the plurality of partition portions 12*mb*. The opening G6 is open toward the bottom and front, and the partition portion 12*mb* is exposed below the opening G6. The distance between the lower wall portion 11*b* and the partition portion 12*mb* may also be substantially the same as the inserted part 90*a* of the flat cable 90*b*, or greater than the thickness of the inserted part 90*a*.

As illustrated in FIG. 3A, the housing 63 of the second connector 60B may have a plurality of pressing portions 63*b* that are aligned in the left-right direction. The pressing portion 63*b* may be formed on the bottom surface of the upper wall portion 63*d* of the housing 63. The housing 63 may have a plurality of pressing portions 63*c* that are aligned in the left-right direction. The pressing portion 63*c* may be formed on the upper surface of the lower wall portion 63*e* of the housing 63. As illustrated in FIG. 3C, when the first connector 10B and the second connector 60B are mated, the upper pressing portion 63*b* fits into the opening G5 of the housing 11B, and the lower pressing portion 63*c* fits into the opening G6 of the housing 11B.

As illustrated in FIG. 3C, the distance D3 between the lower edge of the upper pressing portion 63*b* and the partition portion 12*ma* may be smaller than the thickness of the inserted part 90*a* of the flat cable 90A. In this manner, the inserted part 90*a* of the flat cable 90A is pressed against the partition portion 12*ma*, and the partition portion 12*ma* elastically deforms. Similarly, the distance between the upper edge of the lower pressing portion 63*c* and the partition portion 12*mb* may be smaller than the thickness of the inserted part 90*a* of the flat cable 90B. In this manner, the inserted part 90*a* of the flat cable 90B is pressed against the partition portion 12*mb*, and the partition portion 12*mb* elastically deforms.

The distance D3 between the lower edge of the upper pressing portion 63*b* and the partition portion 12*ma* is smaller than the distance D1 between the upper wall portion 11*a* and the partition portion 12*ma* (see FIG. 3B). Similarly, the distance between the upper edge of the lower pressing portion 63*c* and the partition portion 12*mb* is smaller than the distance between the lower wall portion 11*b* and the partition portion 12*mb*.

As illustrated in FIG. 3C, the vertical distance D4 between the lower edge of the upper pressing portion 63*b* and the upper edge of the lower pressing portion 63*c* is smaller than the distance D5 between the upper edge of the upper partition portion 12*ma* and the lower edge of the lower partition portion 12*mb* plus the thickness of the inserted part 90*a* of the two flat cables 90A and 90B.

The location of the back end G5*a* (see FIG. 3C) of the upper opening G5 may be behind the back end of the conductor pads 91*a* (see FIG. 2F) of the flat cable 90A. In the state where the first connector 10B and the second connector 60B are mated (illustrated in FIG. 3C), the back end 63*f* of the upper pressing portion 63*b* may be behind the back end of the conductor pads 91*a* (see FIG. 2F). These positional relationships may also be applied to the back end G6*a* of the lower opening G6 and the back end 63*g* of the lower pressing portion 63*c*.

In the example described with reference to FIG. 3A and others, the distance D1 (see FIG. 3B) between the upper wall portion 11*a* and the partition portion 12*ma* of the housing 11B is substantially the same as the thickness of the inserted part 90*a* of the flat cable 90A or thicker than the inserted part 90*a*. On the other hand, the distance D1 may be smaller than the thickness of the inserted part 90*a* of the flat cable 90A, as long as the distance is large enough to reduce the friction between the flat cable 90*a* and the partition portion 12*ma* when the flat cable 90A is inserted. This may also be true for the distance between the lower wall portion 11*b* of the housing 11B and the partition portion 12*mb*.

Figure 4:
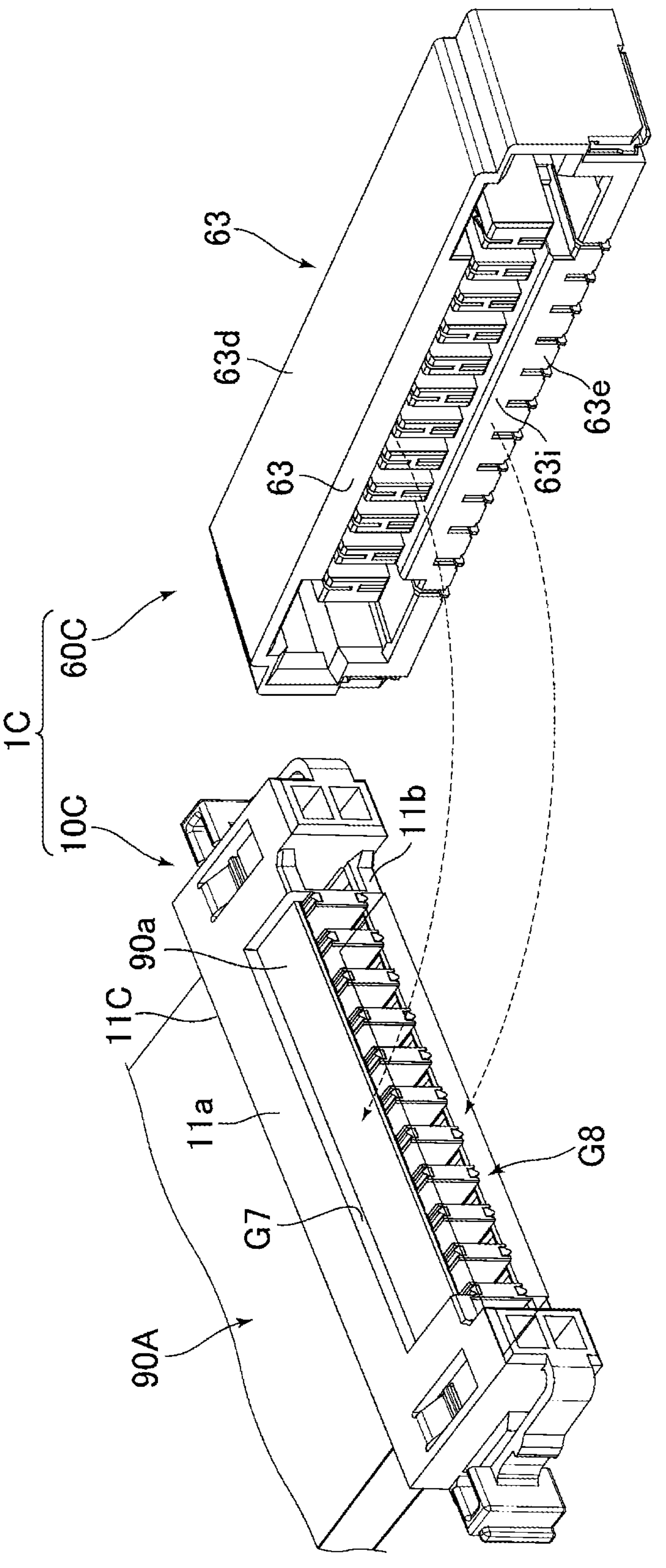
FIG. 4 illustrates a modified example of the connector assembly illustrated in FIG. 3A.

The structure of the pressing portions 63*b* and 63*c* is not limited to the example of the connector assembly 1B illustrated in FIG. 3A, and the like. FIG. 4 illustrates a modified example of the pressing portion. FIG. 4 illustrates a connector assembly 1C having a pressing portion according to a modified example. In the following, the focus is on the differences between the connectors 10B and 60B of the connector assembly 1B described with reference to FIG. 3A and the connectors 10C and 60C of the connector assembly 1C. Items not described for connectors 10C and 60C may be the same as for connectors 10B and 60B.

As illustrated in FIG. 4, the housing 11C of the first connector 10C has an opening G7 in the upper wall portion 11*a*. The opening G7 is formed in such a way that the entire plurality of partition portions 12*ma* are exposed upward. In FIG. 4, the upper surface of the inserted part 90*a* of the flat cable 90A connected to the first connector 10C is exposed through the opening G7. On the other hand, the housing 63 of the second connector 60C has a downward protruding pressing portion 63H on the upper wall portion 63*d* thereof. When the second connector 60C is mated with the first connector 10C, the pressing portion 63*h* fits into the opening G7. Furthermore, the pressing portion 63*h* pushes the inserted part 90*a* of the flat cable 90*a* toward the plurality of partition portions 12*ma*. This causes the partition portions 12*ma* to press against the inserted part 90*a* and elastically deform.

The housing 11C of the first connector 10C has an opening G8 in the lower wall portion 11*b*, as illustrated in FIG. 4. The opening G8 is formed to expose the entire plurality of partition portions 12*mb* downward. On the other hand, the housing 63 of the second connector 60C has a pressing portion 63*i* protruding upward on the lower wall portion 63*e* thereof. When the second connector 60C is mated with the first connector 10C, the pressing portion 63*i* engages with the opening G8. Furthermore, the pressing portion 63*i* pushes the inserted part 90*a* of the flat cable 90B toward the plurality of partition portions 12*mb*. This causes the partition portions 12*mb* to press against the inserted part 90*a* and elastically deform.

The elastic body 12 may be molded separately from the housing 11 and attached to the housing 11. FIG. 5A to FIG. 5D illustrate the first connector 10D as an example of a first connector with such a structure. In the following, the differences between the first connector 10A described with reference to FIG. 2A and the like, and the first connector 10D illustrated in FIG. 5A and the like will be described. Items not described for connector 10D may be the same as for connector 10D.

Figure 5A:
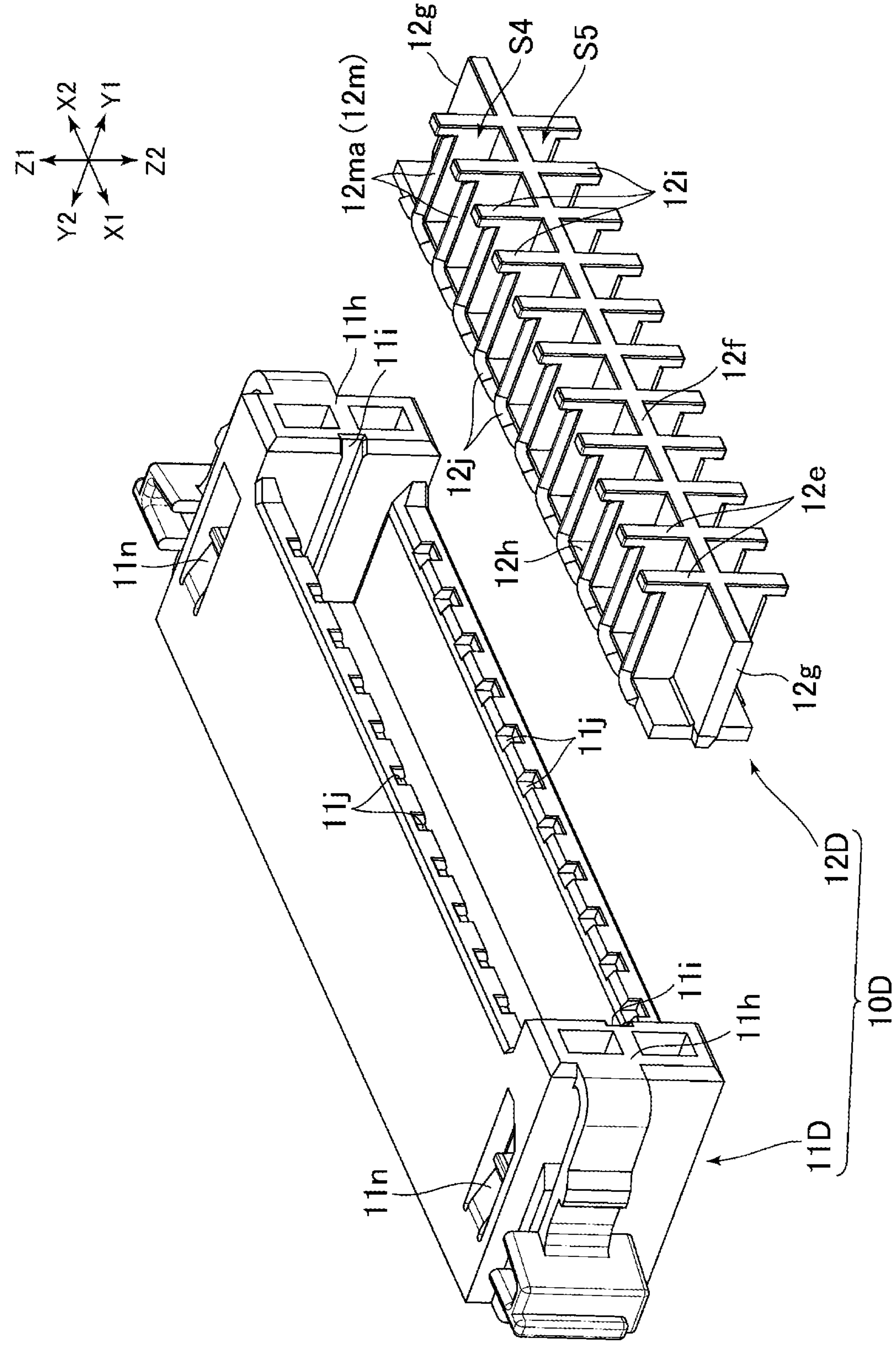
FIG. 5A is an exploded perspective view of a first connector of an additional third example of a connector assembly proposed in the present disclosure.
Figure 5B:
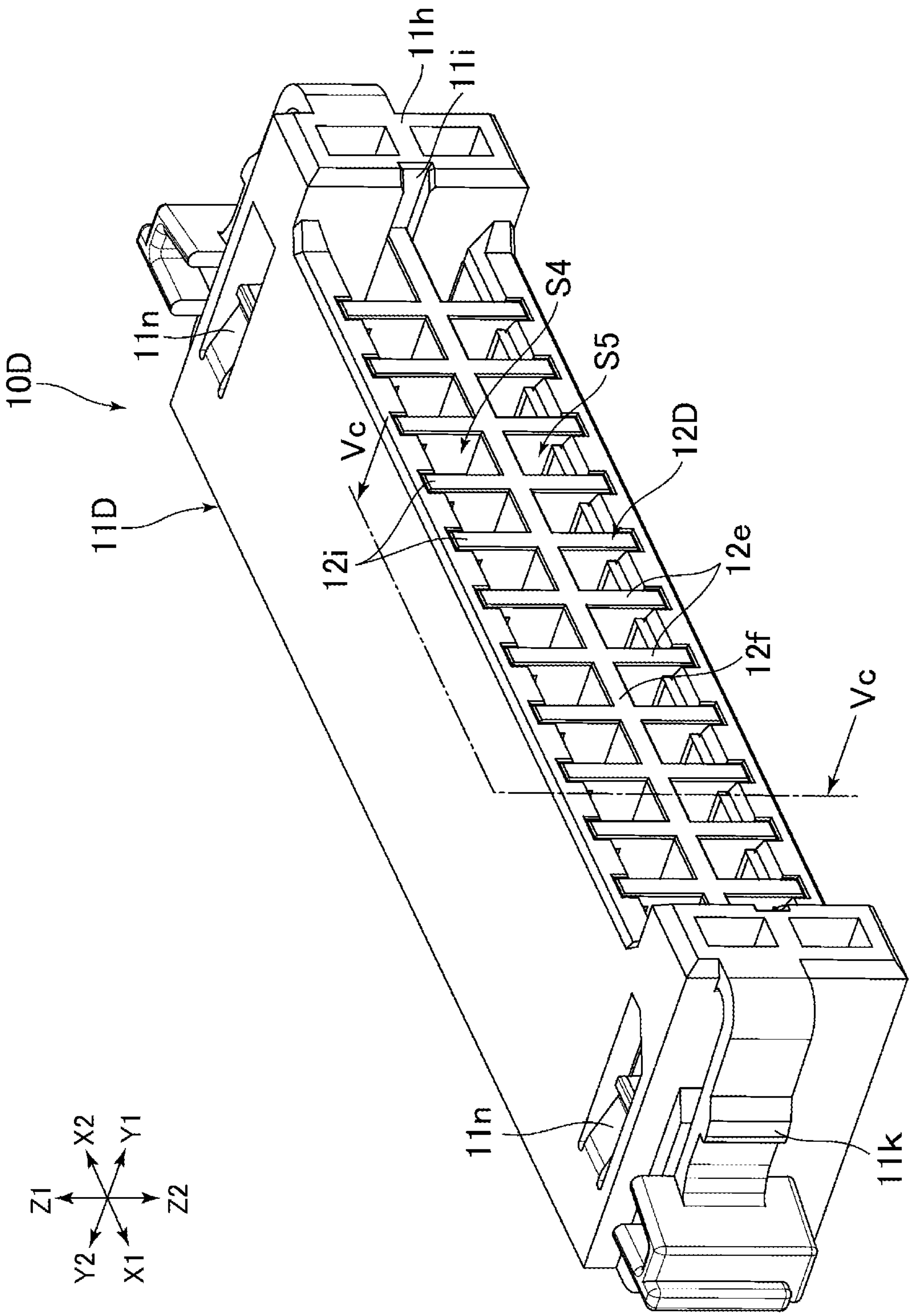
FIG. 5B is a perspective view of the first connector illustrated in FIG. 5A.
Figure 5C:
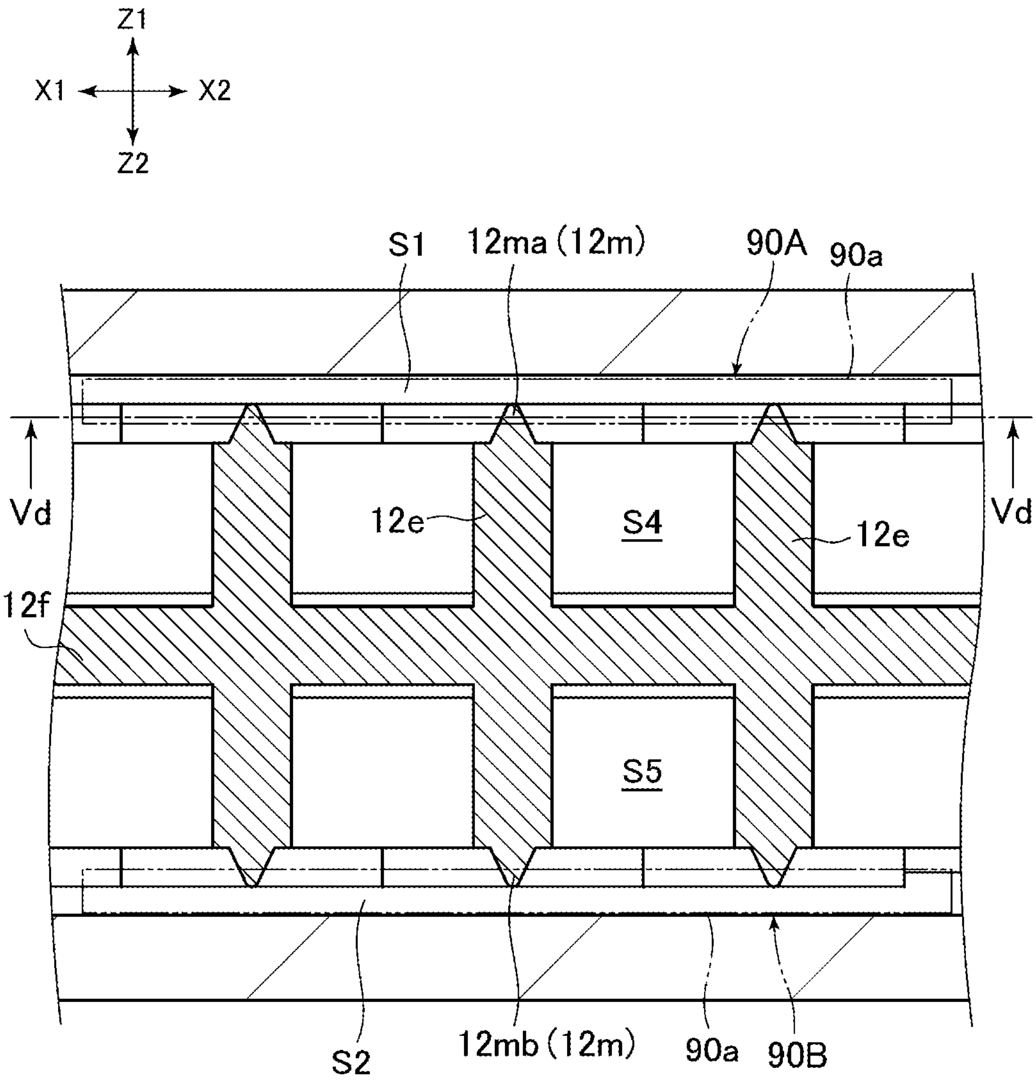
FIG. 5C is a connector cross-sectional view obtained along the line Vc-Vc illustrated in FIG. 5B.

As illustrated in FIG. 5A, the first connector 10D has a housing 11D and an elastic body 12D. The elastic body 12D may have a plurality of partition walls 12*e* that are aligned in the left-right direction. The partition portions 12*ma* and 12*mb* (see FIG. 5C) may be formed on the upper and lower edges of the partition wall 12*e*, respectively.

As illustrated in FIG. 5A, the elastic body 12D may have a connecting vertical wall 12*h* that extends in the left-right direction and connects the back edges of the plurality of partition walls 12*e*. The elastic body 12D may also have a connecting horizontal wall 12*f* that extends in the left-right direction and connects the plurality of partition walls 12*e*. The connecting horizontal wall 12*f* may be formed, for example, to connect the center of the partition walls 12*e* in the vertical direction. The back edge of the connecting horizontal wall 12*f* is connected to the connecting vertical wall 12*h*. The connecting horizontal wall 12*f* and the connecting vertical wall 12*h* are substantially orthogonal. The partition walls 12*e* are substantially orthogonal to the connecting horizontal wall 12*f* and the connecting vertical wall 12*h*, respectively.

According to the structure of the elastic body 12D, the plurality of partition walls 12E are supported by two walls that are substantially orthogonal to each other. This results in more readily ensuring rigidity of the partition wall 12*e*. Furthermore, when the flat cables 90A and 90B are inserted into the insertion paths S1 and S2 (see FIG. 5C) of the first connector 10D, and the partition portions 12*ma* and 12*mb* are pressed against the inserted part 90*a* of the flat cables 90A and 90B; flexure of the partition wall 12*e* can be suppressed. As a result, the contact pressure between the partition portions 12*ma* and 12*mb* and the flat cables 90A and 90B can be sufficiently ensured.

The housing of the second connector (not shown) that connects to the first connector 10D has a plurality of mating portions that fit into the mating holes S4 and S5 (see FIG. 5B) enclosed by the partition wall 12*e* and the connecting horizontal wall 12*f*. Regarding the second connector, the elastic portions 61*b* and 61*c* of the terminals 61 may be located in the mating portion that fits into the upper mating holes S4, and the elastic portions 62*b* and 62*c* of the terminals 62 may be located in the mating portion that fits into the lower mating holes S5.

Figure 5D:
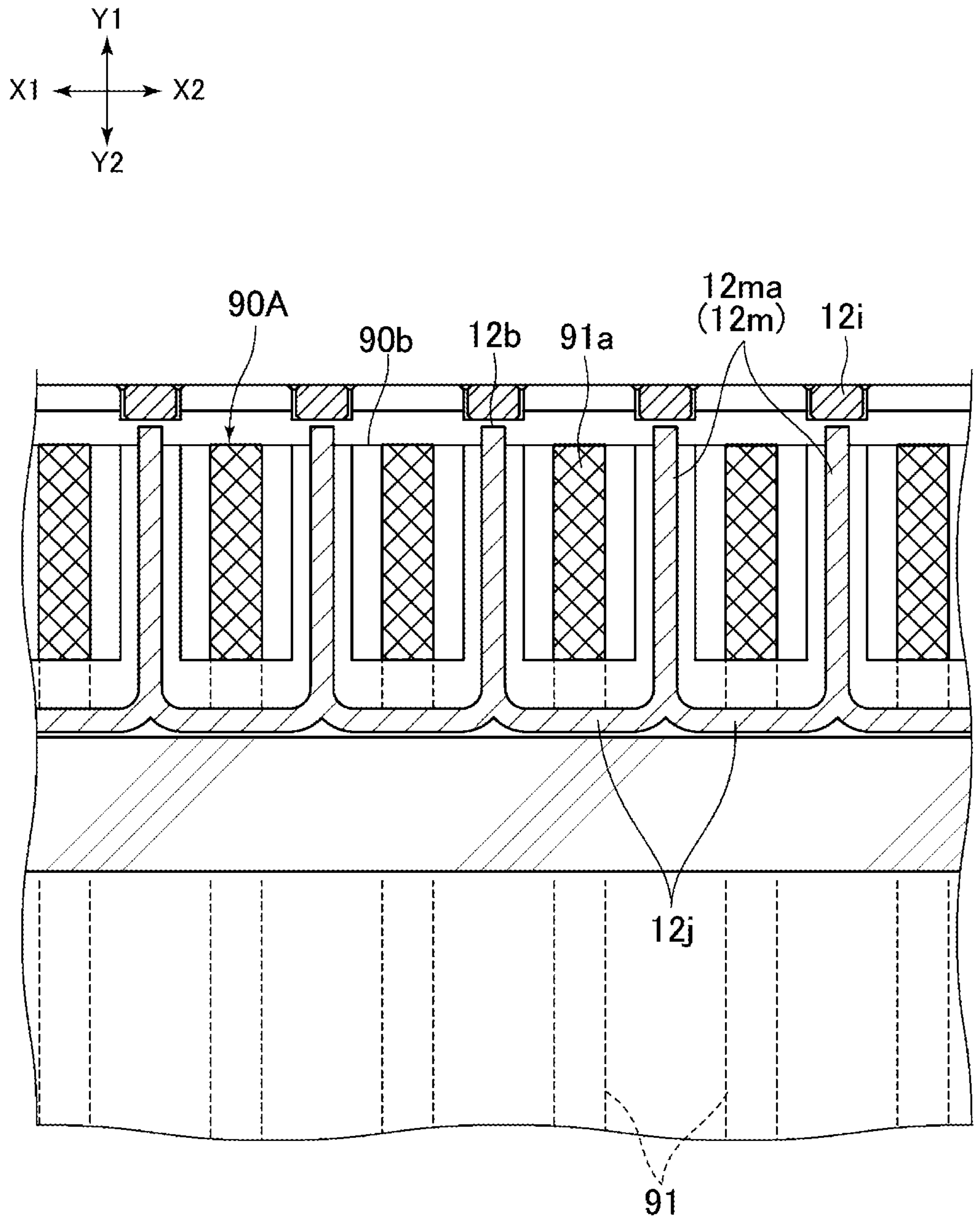
FIG. 5D is a connector cross-sectional view obtained along the line Vd-Vd illustrated in FIG. 5C.

As illustrated in FIG. 5A and FIG. 5D, the elastic body 12 may have a back sealing portion 12*j* formed on the upper and lower edges of the connecting vertical wall 12*h*, in addition to the partition portions 12*ma* and 12*mb* formed on the upper and lower edges of the partition wall 12*e*. The back sealing portion 12*j* formed on the upper edge of the connecting vertical wall 12*h* is connected to the back ends of two adjacent partition portions 12*ma*. As illustrated in FIG. 5D, when the flat cable 90A is inserted into the insertion path S1 of the first connector 10D, the conductor pads 91*a* are surrounded by two adjacent partition portions 12*ma* and the back sealing portion 12*j*. Herein, the back sealing portion 12*j*, as well as the partition portion 12*ma*, is pressed against the inserted part 90*a* and elastically deforms. This suppresses the back portion of the two adjacent conductor pads 91*a* from connecting due to condensation. The back ends of the two adjacent partition portions 12*mb* may be connected to each other by the back sealing portion 12*j* formed on the lower edge of the connecting vertical wall 12*h*.

As illustrated in FIG. 5D, the front end 12*b* of the partition portion 12*ma* is located further forward than the front edge 90*b* of the flat cable 90A. This more reliably suppresses the front part of the two adjacent conductor pads 91*a* from connecting due to condensation. This is also true for the lower partition portions 12*mb*. In other words, the front end of the partition portions 12*mb* are located forward of the front edge of the flat cable 90B. The housing 11D may have a stopper portion on the interior thereof that specifies the position of the flat cables 90A and 90B in the front-to-back direction.

As illustrated in FIG. 5A, the connecting horizontal wall 12*f* may have a guided portion 12*g* at the right and left ends thereof. The guided portion 12*g* may be the part of the elastic body 12 that protrudes to the right and left more than other parts of the elastic body 12 (for example, the connecting vertical wall 12*h*). On the other hand, the housing 11D has guide portions 11*i* on the inner surface of the left and right side wall portions 11*h*. The guide portion 11*i* is a concave portion that extends in the front-to-back direction, for example. The guided portion 12*g* engages with the guide portion 11*i*. This allows the elastic body 12D to be supported inside the housing 11D.

As illustrated in FIG. 5A, the elastic body 12D has a stopped portion 12*i*. The elastic body 12D is inserted inside the housing 11D from the front side of the housing 11D. The stopped portion 12*i* hooks onto the front edge of the housing 11D and sets the position of the elastic body 12D in the front-to-back direction. As illustrated in FIG. 5A, the stopped portion 12*i* may be formed at the top and bottom of the front edge of each partition wall 12*e*, for example. The front edge of the housing 11D may have a stopper portion 11*j* that engages with this stopped portion 12*i*.

Regarding the connector assemblies described so far, the first connectors 10A to 10D, to which the flat cables 90A and 90B are connected, are provided with partition portions 12*ma* and 12*mb*. Differing therefrom, partition portions can be provided in the second connector. FIG. 6A to FIG. 6D illustrate connector assembly 1E as an example of a connector assembly with such a structure. In the following, the differences between the connector assembly described so far and the connector assembly 1E illustrated in FIG. 6A, and the like will be described. Items not described for connector assembly 1E may be the same as for the connector assemblies described so far.

Figure 6A:
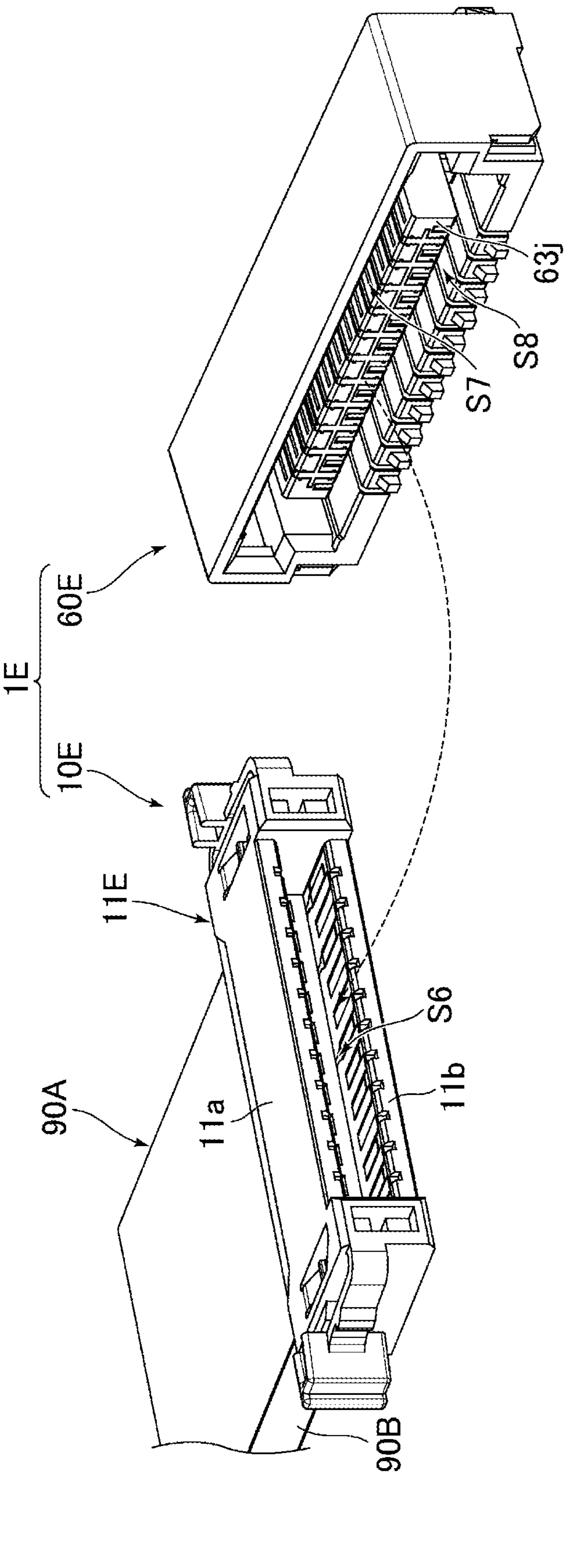
FIG. 6A is a perspective view illustrating a fourth example of a connector assembly according to the present disclosure.

As illustrated in FIG. 6A, the connector assembly 1E has a first connector 10E and a second connector 60E. The first connector 10E is a connector that is attached to the end of the flat cables 90A and 90B. The second connector 60E may be a connector mounted on a circuit board, similar to the second connectors described so far.

As illustrated in FIG. 6A, the first connector 10E has a housing 11E. A mating hole S6 is formed in the housing 11E. The bottom surface of the inserted part 90*a* of the flat cable 90A and the upper surface of the inserted part 90*a* of the flat cable 90B are exposed at the mating hole S6. As illustrated in FIG. 6D, the housing 11E has a cable supporting portion 11M on the side thereof. The inserted part 90*a* of the flat cable 90A is retained between the cable supporting portion 11M and the upper wall portion 11*a*. Similarly, the inserted part 90*a* of the flat cable 90B is retained between the cable supporting portion 11*m* and the lower wall portion 11*b*.

Figure 6B:
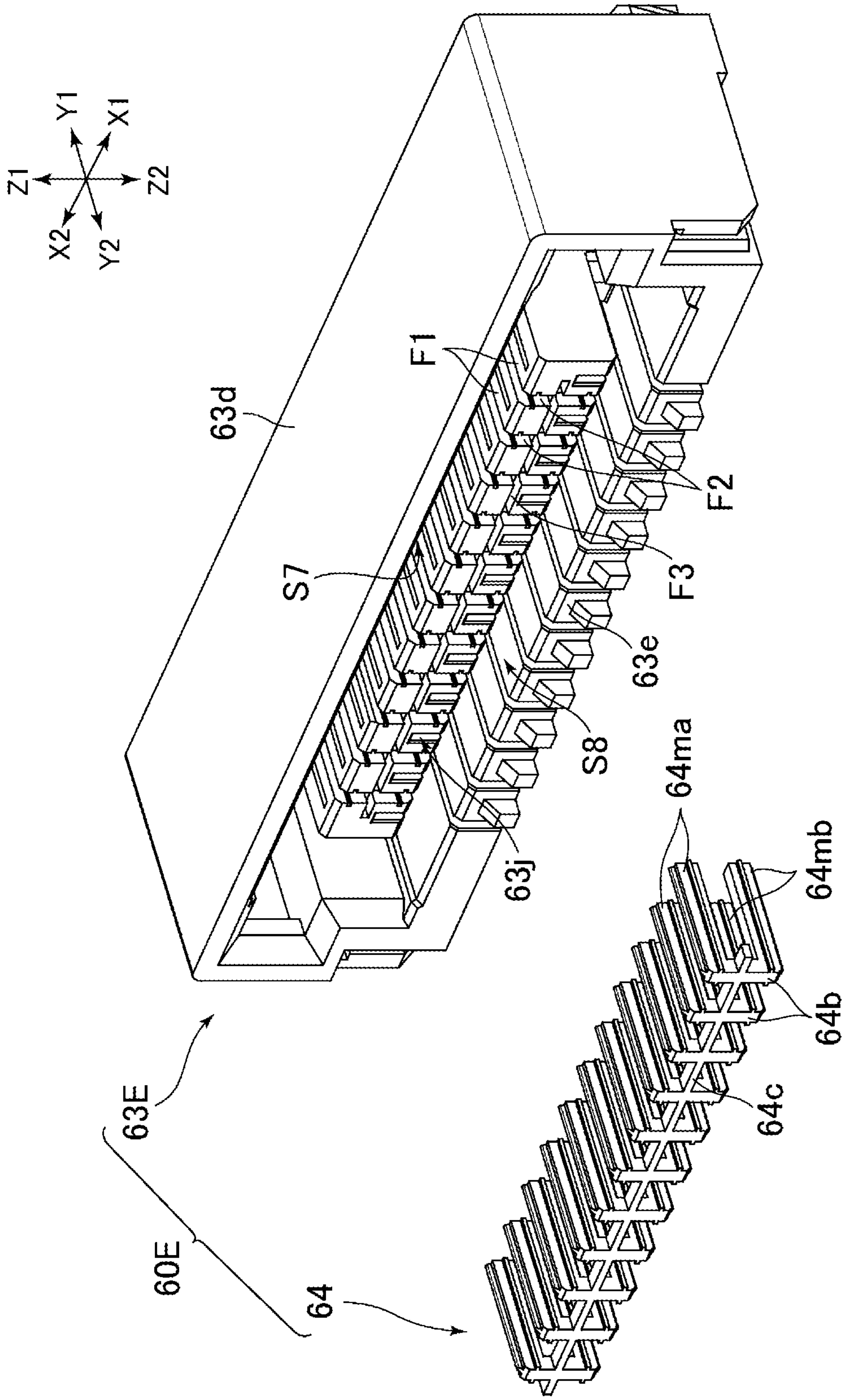
FIG. 6B is an exploded perspective view of a second connector of the connector assembly illustrated in FIG. 6A.
Figure 6C:
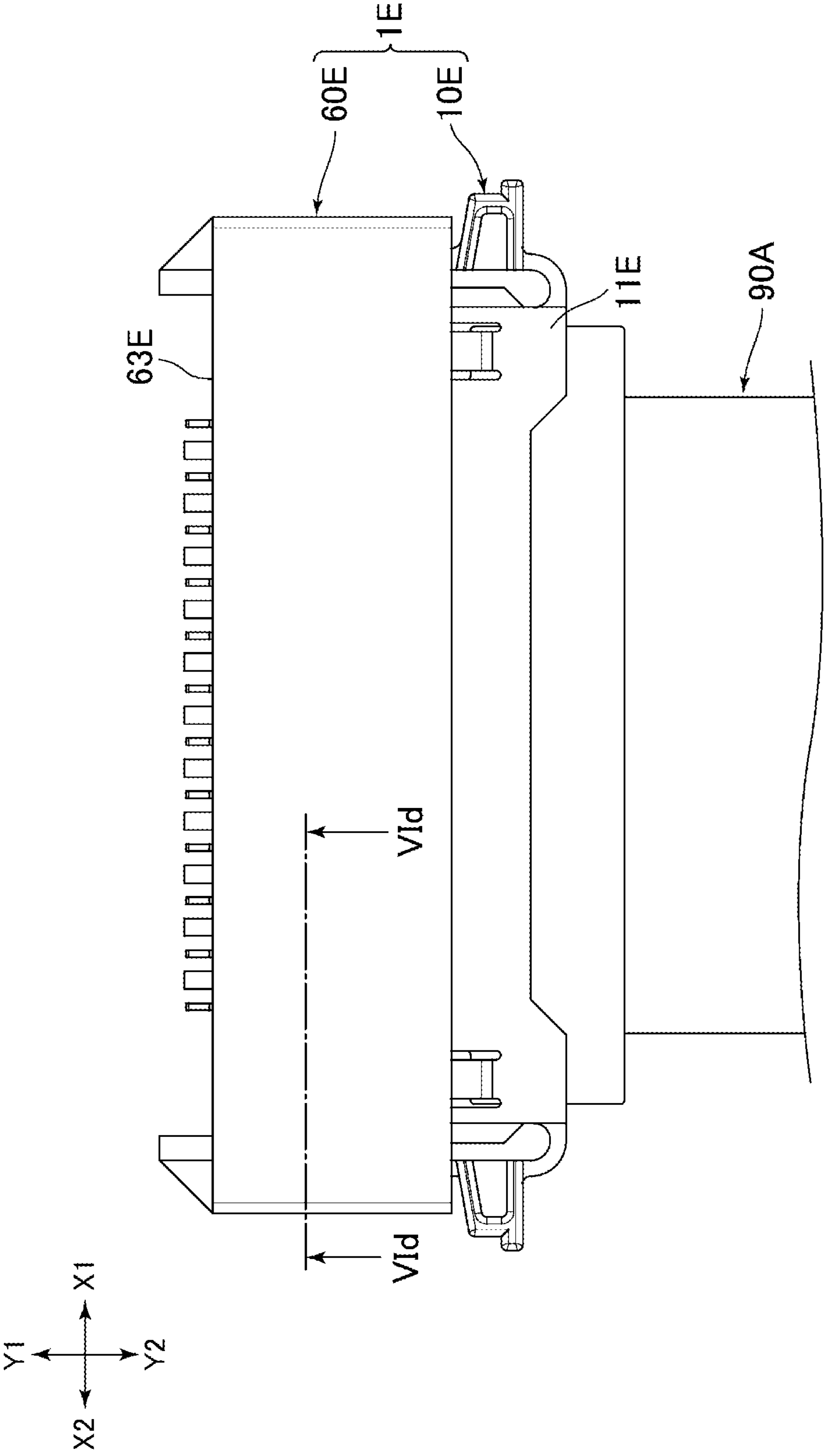
FIG. 6C is a plan view of the connector assembly illustrated in FIG. 6A.
Figure 6D:
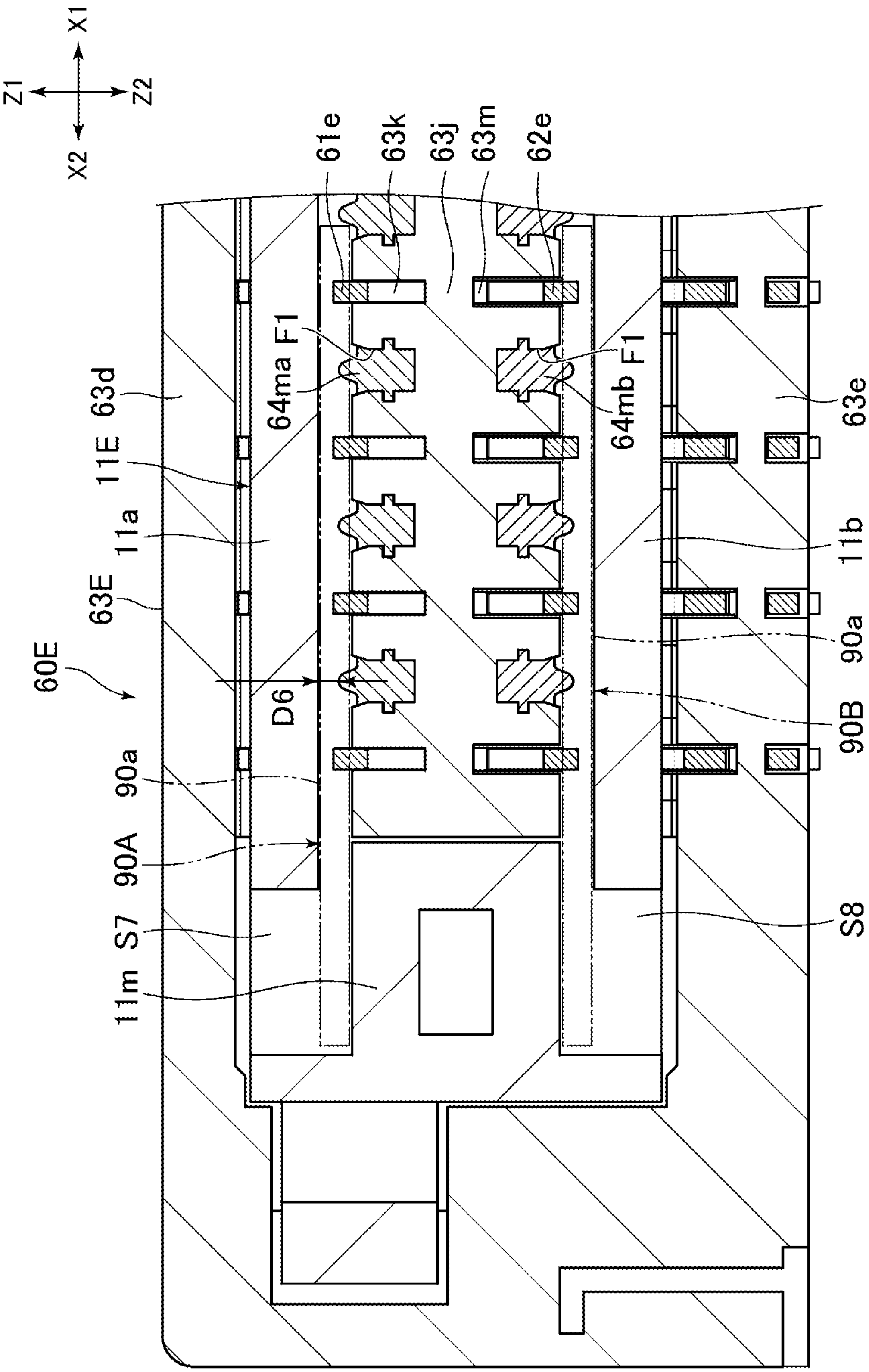
FIG. 6D is a connector cross-sectional view obtained along the line VId-VId illustrated in FIG. 6C.

As illustrated in FIG. 6B, the housing 63E of the second connector 60E has a mating portion 63J on the inner side thereof. The mating portion 63*j* is the portion that engages with the mating hole S6 (see FIG. 6A) of the first connector 10E. The second connector 60E has terminals 61 and 62 (see FIG. 1C) that are aligned in the left-right direction. The mating portion 63*j* may have a plurality of grooves 63*k* (see FIG. 6D) in the upper part thereof where the elastic portions 61C and 61*d* (see FIG. 1C) of the terminals 61 are arranged. The mating portion 63*j* may have a plurality of grooves 63*m* (see FIG. 6D) in the lower part thereof where the elastic portions 62*c* and 62*d* (see FIG. 1C) of the terminals 62 are arranged.

As illustrated in FIG. 6D, the second connector 60E has insertion paths S7 and S8. The insertion path S7 may be formed between the mating portion 63*j* and the upper wall portion 63*d* of the housing 63E. On the other hand, the insertion path S8 may be formed between the mating portion 63*j* and the lower wall portion 63*e* of the housing 63E. The flat cables 90A and 90B are inserted into the insertion paths S7 and S8, respectively.

As described above, regarding the connector assembly 1E, the first connector 10E is attached to the end portions of the flat cables 90A and 90B. As illustrated in FIG. 6D, the inserted part 90*a* of the upper flat cable 90A is arranged along the bottom surface of the upper wall portion 11*a* of the housing 11E. The upper wall portion 11*a* of the housing 11E and the inserted part 90*a* of the flat cable 90A are inserted into the insertion path S7 of the second connector 60E. On the other hand, the lower wall portion 11*b* of the housing 11E and the inserted part 90*a* of the flat cable 90B may be inserted into the insertion path S8 of the second connector 60E.

As illustrated in FIG. 6B and FIG. 6D, the second connector 60E has an elastic body 64 (see FIG. 6B), which is formed of elastic material. The material of the elastic body 64 is the same as the elastic body 12, for example, elastomer, silicone, rubber, or the like. A plurality of partition portions 64*ma* and 64*mb* are formed in the elastic body 64.

As illustrated in FIG. 6D, the plurality of partition portions 64*ma* are aligned in the left-right direction and are arranged along the insertion path S7. The plurality of partition portions 64*ma* are formed in the upper part of the mating portion 63*j* of the housing 63. Each partition portion 64*ma* is arranged between two adjacent terminals 61. When the first connector 10E and the second connector 60E are mutually mated, each partition portion 64*ma* faces the bottom surface of the flat cable 90A (the surface where the conductor pads 91*a* are exposed) and is arranged between the two adjacent conductor lines 91 (more specifically, the conductor pads 91*a*). This enables the partition portions 64*ma* to prevent two adjacent conductor pads 91*a* from being connected due to condensation.

The plurality of partition portions 64*mb* are also aligned in the left-right direction and arranged along the insertion path S8, similar to the partition portions 64*ma*. A plurality of partition portions 64*mb* are formed in the lower part of the mating portion 63*j* of the housing 63. Each partition portion 64*mb* is located between two adjacent terminals 62. When the first connector 10E and the second connector 60E are mutually mated, each partition portion 64*mb* faces the upper surface of the flat cable 90B (the surface where the conductor pads 91*a* are exposed) and is arranged between the two adjacent conductor lines 91 (more specifically, the conductor pads 91*a*). This enables the partition portion 64*mb* to prevent the two adjacent conductor pads 91*a* from connecting due to condensation.

When the first connector 10E and the second connector 60E are mutually mated, the positional relationship between the partition portions 64*ma* and 64*mb* and the conductor pads 91*a* in the front-to-back direction may be the same as the positional relationship between the partition portions 12*ma* and 12*mb* and the conductor pads 91*a* described with reference to FIG. 2F. In other words, the position of the conductor pads 91*a* in the front-to-back direction may be between the front and back ends of the partition portions 64*ma* and 64*mb*. The position of the contact portions 61*e*, 61*f*, 62*e*, 62*f* of terminals 61 and 62 in the front-to-back direction may be between the front and back ends of the partition portions 64*ma* and 64*mb*.

When the first connector 10E and the second connector 60E are mutually mated, the distance D6 between the upper wall portion 11*a* of the housing 11E and the partition portion 64*ma* may be smaller than the thickness of the inserted part 90*a* of the flat cable 90A. (In this description, the distance D6 is the distance between the top of the partition portion 64*ma* and the bottom of the upper wall portion 11*a*.) With this structure, when the operator connects the first connector 10E and the second connector 60E, the partition portion 64*ma* is pressed against the bottom surface of the inserted part 90*a* and elastically deforms. Similarly, the distance between the lower wall portion 11*b* of the housing 11E and the partition portion 64*mb* may be smaller than the thickness of the inserted part 90*a* of the flat cable 90B.

As illustrated in FIG. 6B, the plurality of partition portions 64*ma* and 64*mb* may be interconnected. According to this structure, the manufacturing of the second connector 60E can be facilitated. In the example illustrated in the diagram, the elastic body 64 has a vertical connection 64*b* that connects the back ends of the two partition portions 64*ma* and 64*mb* that face each other in the vertical direction. The elastic body 64 has a transverse connection 64*c* that connects a plurality of vertical connections 64*b* that are aligned in the left-right direction. This connects the entire plurality of partition portions 64*ma* and 64*mb* of the second connector 60E.

The elastic body 64 may be formed into the housing 63E by two-color molding. In other words, the housing 63E may be molded in a primary mold, and then the housing 63E may be placed in a secondary mold, and the secondary mold may be used to mold the elastic body 64. In this manner, the second connector 60E can be efficiently molded.

In order to achieve such two-color molding, the mating portion 63*j* of the housing 63E may have a groove F1 (see FIG. 6D) extending in the front-to-back direction and forming the partition portions 64*ma* and 64*mb*, a groove F2 extending in the vertical direction and forming the vertical connection 64*b*, and a groove F3 extending in the left-right direction and forming the transverse connection 64*c*, as illustrated in FIG. 6B. And these grooves F1, F2, and F3 are connected to each other.

Unlike the second connector 60E, the elastic body 64 may be formed separately from the housing 63E and attached to the mating portion 63*j*. In this case, the elastic body 64 can be adhered to the mating portion 63*j* or have a portion (for example, a tab) that engages the housing 63E.

As described above, in the first connectors 10A, 10B, 10C, and 10D, the housings 11, 11B, 11C, and 11D have insertion paths S1 and S2 into which the flat cables 90A and 90B can be inserted. The connectors 10A, 10B, 10C, and 10D have a plurality of partition portions 12*ma* and 12*mb*, which are formed of elastic material. The partition portions 12*ma* and 12*mb* are arranged along the insertion paths S1 and S2. When the flat cables 90A and 90B are inserted into the insertion paths S1 and S2, the partition portions 12*ma*, 12*mb*, and 64*ma* are positioned between two adjacent conductor lines 91. Regarding the second connector 60E, the housing 63E has insertion paths S7 and S8 into which the flat cables 90A and 90B can be inserted. The second connector 60E has a plurality of partition portions 64*ma* and 64*mb*, which are formed of elastic material. The partition portions

64*ma* and 64*mb* are arranged along the insertion paths S7 and S8. When the flat cables 90A and 90B are inserted into the insertion paths S7 and S8, the partition portions 64*ma* and 64*mb* are positioned between two adjacent conductor lines 91. With the connectors 10A, 10B, 10C, 10D, and 60E, the insulation between two adjacent conductor pads 91*a* formed on the flat cables 90A and 90B can be prevented from deteriorating due to condensation without special processing of the flat cable 90A and 90B or enlargement of the connector.

The connectors and connector assemblies proposed in this disclosure are not limited to the connectors 10A, 10B, 10C, 10D, and 60E, and connector assemblies 1A, 1B, 1C, and 1E described above, and may be modified in various ways.

For example, in the above description, the first connector and the second connector were connected in the direction along the circuit board where the second connector is mounted (more specifically, the front-to-back direction). However, the first connector and the second connector may be connected in a direction perpendicular to the circuit board on which the second connector is mounted.

In the above explanation, the second connector was a connector mounted on a circuit board. However, the connector assembly may have two first connectors to which the two flat cables are connected respectively, and a second connector. The two first connectors may then be connected to the second connector, electrically connecting the two flat cables. In other words, the second connector is not a connector that connects to the circuit board, but may be a relay connector that connects two flat cables. In this case, the partition portions that prevent degradation of the insulation between the conductor lines caused by condensation may be formed in the first connector or in the second connector.

The invention claimed is:

1. A connector comprising:

a flat cable having a first surface with a plurality of conductor lines formed aligned in a first direction; and a housing defining an insertion path enabling insertion of the flat cable in a second direction and a plurality of partition portions formed of an elastic material aligned in the first direction, wherein each of the plurality of partition portions are arranged along the insertion path and arranged between two adjacent conductor lines enabling contact with the first surface when the flat cable is inserted into the insertion path.

2. The connector according to claim 1, wherein the flat cable has an inserted part arranged in the insertion path, the housing has an opposing part that faces a second surface of the flat cable that is on an opposite side from the first surface, and a distance between the opposing part of the housing and the plurality of partition portions in a third direction that is a thickness direction of the flat cable is smaller than a thickness of the inserted part of the flat cable.

3. The connector according to claim 1, wherein the housing has an opposing part that faces a second surface of the flat cable that is on an opposite side from the first surface, and the housing has an opening on the opposing part configured to engage a pressing member that pushes the flat cable towards the plurality of partition portions.

4. The connector according to claim 1, wherein the housing has a supporting portion formed using a material with higher rigidity than that of the plurality of partition portions, the supporting portion is formed with a plurality of grooves aligned in the first direction, and the plurality of partition portions are formed respectively in the plurality of grooves.

5. The connector according to claim 1, wherein the housing has a plurality of supporting walls aligned in the first direction and formed of a material with a higher rigidity than that of the plurality of partition portions, and the plurality of partition portions are respectively formed on the plurality of supporting walls.

6. The connector according to claim 1, further comprising an elastic body with a connecting part that connects the plurality of partition portions.

7. The connector according to claim 1, wherein each of the plurality of partition portions has a first end and a second end positioned on mutually opposite sides in the second direction, each of the conductor lines of the flat cable has a conductor pad enabling contacting a terminal, and the position of the conductor pads in the second direction when the flat cable is inserted into the insertion path is between the first end and the second end.

8. A connector assembly, comprising:

a first connector comprising a flat cable with a first surface with a plurality of conductor lines formed aligned in a first direction, the flat cable having a housing with an insertion path enabling insertion in a second direction; and a second connector comprising housing configured to retain a plurality of terminals respectively in contact with the plurality of conductor lines aligned in the first direction, wherein one of the first connector or the second connector includes a plurality of partition portions formed of an elastic material and aligned in the first direction, and each of the plurality of partition portions is positioned between two adjacent terminals and arranged along the insertion path in a state where the first connector and second connector are connected.

9. The connector assembly according to claim 8, wherein the housing of the first connector includes an opposing portion facing a second surface of the flat cable that is on an opposite side from the first surface, an opening is formed on the opposing portion, and the second connector includes a pressing portion that engages with the opening and pushes the flat cable towards the plurality of partition portions.

* * * * *